United States Patent
Yucek

(10) Patent No.: US 9,386,581 B2
(45) Date of Patent: Jul. 5, 2016

(54) TELEVISION HIGH THROUGHPUT COMMUNICATION

(71) Applicant: Qualcomm Incorporated, San Diego, CA (US)

(72) Inventor: Tevfik Yucek, Santa Clara, CA (US)

(*) Notice: Subject to any disclaimer, the term of this patent is extended or adjusted under 35 U.S.C. 154(b) by 319 days.

(21) Appl. No.: 13/831,304

(22) Filed: Mar. 14, 2013

(65) Prior Publication Data

US 2013/0336239 A1    Dec. 19, 2013

Related U.S. Application Data

(60) Provisional application No. 61/659,945, filed on Jun. 14, 2012, provisional application No. 61/668,347, filed on Jul. 5, 2012, provisional application No. 61/672,241, filed on Jul. 16, 2012.

(51) Int. Cl.
| | |
|---|---|
| *H04W 16/14* | (2009.01) |
| *H04W 74/08* | (2009.01) |
| *H04W 72/04* | (2009.01) |
| *H04W 74/00* | (2009.01) |

(52) U.S. Cl.
CPC .......... *H04W 72/0453* (2013.01); *H04W 16/14* (2013.01); *H04W 74/002* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 9,148,873 B1* | 9/2015 | Liu | H04W 72/04 |
| 2012/0263156 A1* | 10/2012 | Abraham et al. | 370/338 |
| 2012/0263157 A1 | 10/2012 | Porat | |

(Continued)

FOREIGN PATENT DOCUMENTS

| | | |
|---|---|---|
| EP | 2658200 A1 | 10/2013 |
| WO | 2012142481 | 10/2012 |

OTHER PUBLICATIONS

"IEEE P802.11ac(TM)/D0.2, Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Very High Throughput for Operation in Bands below 6 GHz", XP055029328.

(Continued)

*Primary Examiner* — Hoon J Chung
(74) *Attorney, Agent, or Firm* — Sayed H. Beladi

(57) ABSTRACT

Systems and methods of performing communication via television high throughput (TVHT) bandwidth channels are disclosed. Values of one or more physical layer parameters for use in communication via TVHT parameters are also defined. A short inter-frame spacing (SIFS) time is 120 microseconds (μs) for a 6 megahertz (MHz) or a 7 MHz bandwidth channel, and is 90 μs for an 8 MHz bandwidth channel. The parameters also include a clear channel assessment (CCA) time of 15 μs for a 6 MHz or 7 MHz bandwidth channel and 11.25 μs for an 8 MHz bandwidth channel. Additional parameters, such as compliance with a spectral flatness constraint, transmit center frequency tolerance, symbol clock frequency tolerance, transmitter center frequency leakage, transmitter constellation error, and non-HT duplicate transmission are also defined (e.g., for inclusion into a standard, such as Institute of Electrical and Electronics Engineers (IEEE) 802.11af).

44 Claims, 8 Drawing Sheets

(56) References Cited

U.S. PATENT DOCUMENTS

2012/0327870 A1 12/2012 Grandhi et al.
2013/0034091 A1 2/2013 Kim et al.

OTHER PUBLICATIONS

International Search Report and Written Opinion—PCT/US2013/040645—ISAEPO—Jan. 15, 2014.

Rich Kennedy (Research in Motion): "Meeting Plan and Agend San Diego 2012; 11-12-0821-01-00af-meeting-plan-and-agend-san-diego-2012," IEEE SA Mentor; 11-12-0821-01-00AF-Meeting-Plan-and-Agend-San-Diego-2012, IEEE-SA Mentor, Piscataway, NJ USA, vol. 802.11af, No. 1, Jul. 31, 2012, pp. 1-54, XP068039342.

Tevfik Yucek (Qualcomm): "11af SIFS value; 11-12-1242-00-00af-11af-sifs-value," IEEE SA Mentor; 11-12-1242-00-00AF-SIFS-Value, IEEE-SA Mentor, Piscataway, NJ USA, vol. 802.11af, Oct. 23, 2012, pp. 1-3, XP068040023.

Lee W., "TVWS Regulations and IEEE 802.11af" LG Electronics. Nov. 2012, pp. 1-60.

Yucek, Y.,"11af Interframe Spacing", doc.: IEEE 802.11-12/0914rl, Jul. 16, 2013, 10 pp., https://mentor.ieee.org/802.11/dcn/12/11-12-0914-01-00af-11af-interframe-spacing-parameters.pptx.

Porat, R., "TGaf PHY Overview", doc.: IEEE 802.11-12/0866r2, Jul. 20, 2012, 8 pp., https://mentor.ieee.org/802.11/dcn/12/11-12-0866-02-00af-phy-overview.pptx.

* cited by examiner

TELEVISION HIGH THROUGHPUT COMMUNICATION

I. CLAIM OF PRIORITY

This application claims priority from U.S. Provisional Patent Application No. 61/659,945, filed Jun. 14, 2012, entitled "APPARATUS AND METHODS FOR IEEE 802.11af SPECIFICATION," U.S. Provisional Patent Application No. 61/668,347, filed Jul. 5, 2012, entitled "PHYSICAL LAYER PARAMETERS FOR INSTITUTE OF ELECTRICAL AND ELECTRONICS ENGINEERS (IEEE) 802.11af STANDARD," and U.S. Provisional Patent Application No. 61/672,241, filed Jul. 16, 2012, entitled "PHYSICAL LAYER PARAMETERS FOR INSTITUTE OF ELECTRICAL AND ELECTRONICS ENGINEERS (IEEE) 802.11af STANDARD," the contents of each of which are incorporated by reference in their entirety.

II. FIELD OF THE DISCLOSURE

The present disclosure is generally directed to television high throughput communication.

III. BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless computing devices include other types of devices that are incorporated therein. For example, wireless computing devices can also include a digital still camera, a digital video camera, a digital recorder, and an audio file player. Also, such wireless computing devices include a processor that can process executable instructions, including software applications, such as a web browser application, that can be used to access the Internet. As such, these wireless computing devices can include significant computing capabilities. As use of wireless computing devices increase, bandwidth allocated to wireless communication may become congested with increased traffic. To alleviate such congestion, one possible approach is to allocate bandwidth to wireless computing devices that was previously allocated to other devices or systems.

In many countries, wireless transmission frequency bands are regulated by a government regulatory agency. The Federal Communications Commission (FCC) in the United States and similar regulatory agencies in other countries regulate wireless transmission frequency bands and issue broadcast licenses in particular frequency ranges. To illustrate, a television broadcaster may be licensed for television channel transmission for a particular channel defined by a particular frequency range in a particular geographic area.

As demand for wireless data communications has increased, some regulatory agencies have recognized that current licensing schemes may lead to inefficient use of the wireless transmission frequency spectrum. As a result, regulatory agencies have enacted rules to allow unlicensed users (such as individual consumers) to use licensed frequencies in "white spaces." A white space may generally refer to a frequency range (e.g., one or more channels) that is regulated but unused within a particular geographic area at a particular time. For example, the FCC recently made vacant/unused television (TV) white space spectrum (commonly called television white space (TVWS)) available for unlicensed use by TV band (TVBD) devices. The FCC has also set guidelines in order for TVBD devices to use the TV white spaces.

IV. SUMMARY

The Institute of Electrical and Electronics Engineers (IEEE) has promulgated various industry specifications related to wireless networking, many of which are designated with the "IEEE 802.11" name. For example, 802.11b (entitled "Higher Speed Physical Layer Extension in the 2.40 Hz Band" and referred to as Clause 18) is a wireless networking standard that may be used in customer premise wireless networking, such as in a home or office environment. "In progress" IEEE 802.11 standards include 802.11ad (entitled "Very High Throughput in 60 GHz" and referred to as Clause 22) and 802.11af (entitled "Wireless Local Area Network (LAN) in Television White Space" and referred to as Clause 23).

IEEE 802.11af is a standard for using television white space spectrum for wireless local area network (WLAN) communication. Some items not yet finalized by IEEE 802.11af include physical layer (PHY) parameters or constraints. The present disclosure provides one or more parameters or constraints for television white space networks (e.g., networks that may be compatible with the IEEE 802.11af standard) and for transmissions (that are to comply with the IEEE 802.11af standard) to enable a station (e.g., a transmitter or a transmit station) to transmit the PPDU. The one or more parameters or constraints may be associated with or include a spectral flatness, a transmit center frequency tolerance, a symbol clock frequency tolerance, a transmit center frequency leakage, a transmitter constellation error, and one or more inter-frame spacing (timing) parameters.

Based on the one or more parameters or constraints, a station (e.g., a mobile communication device), may transmit a protocol data unit (PPDU) or a very high throughput (VHT) data symbol using television (TV) high throughput (TVHT) bandwidth channels. The PPDU may include one or more symbols and may be transmitted via a TVWS network. The TVHT bandwidth channels may include 6 megahertz (MHz) bandwidth channels, 7 MHz bandwidth channels, 8 MHz bandwidth channels, or a combination thereof. The TVHT bandwidth channels may also be referred to as basic channel units (BCUs) (e.g., a frequency segment) that include 6 MHz bandwidth channels, 7 MHz bandwidth channels, 8 MHz bandwidth channels, or a combination thereof.

In a particular embodiment, a method includes transmitting, from a station, a very high throughput (VHT) data symbol via a television (TV) high throughput (TVHT) bandwidth channel. One or more inter-frame timing parameters are used to transmit the VHT data symbol via the TVHT bandwidth channel. The one or more inter-frame timing parameters include a clear channel assessment (CCA) time of 15 microseconds (µs) for a 6 megahertz (MHz) bandwidth channel or for a 7 MHz bandwidth channel, 11.25 µs for an 8 MHz bandwidth channel, or a combination thereof.

In another particular embodiment, a device includes a processor and a transmitter. The processor is configured to initiate a transmission of a very high throughput (VHT) data symbol. The transmitter is configured to transmit the VHT data symbol via a television (TV) high throughput (TVHT) bandwidth channel. One or more inter-frame timing parameters are used to transmit the VHT data symbol via the TVHT bandwidth channel. The one or more inter-frame timing parameters include a clear channel assessment (CCA) time of 15 microseconds (μs) for a 6 megahertz (MHz) bandwidth channel or for a 7 MHz bandwidth channel, 11.25 μs for an 8 MHz bandwidth channel, or a combination thereof.

In another particular embodiment, a method includes transmitting, from a station, a very high throughput (VHT) data symbol via a television (TV) high throughput (TVHT) bandwidth channel. One or more inter-frame timing parameters are used to transmit the VHT data symbol via the TVHT bandwidth channel. The one or more inter-frame timing parameters include a short inter-frame space (SIFS) time of 120 microseconds (μs) for a 6 megahertz (MHz) bandwidth channel or for a 7 MHz bandwidth channel, 90 μs for an 8 MHz bandwidth channel, or a combination thereof.

In another particular embodiment, a device includes a processor and a transmitter. The processor is configured to initiate a transmission of a very high throughput (VHT) data symbol. The transmitter is configured to transmit the VHT data symbol via a television (TV) high throughput (TVHT) bandwidth channel. One or more inter-frame timing parameters are used to transmit the VHT data symbol via the TVHT bandwidth channel. The one or more inter-frame timing parameters include a short inter-frame space (SIFS) time of 120 microseconds (μs) for a 6 megahertz (MHz) bandwidth channel or for a 7 MHz bandwidth channel, 90 μs for an 8 MHz bandwidth channel, or a combination thereof.

One particular advantage provided by the disclosed embodiments is one or more physical layer (PHY) parameters or constraints that enable transmission and reception of data via a TVWS network. The one or more physical layer (PHY) parameters or constraints may be included in a standard, such as the IEEE 802.11af standard. For example, the one or more parameters or constraints included in the IEEE 802.11af standard may include a spectral flatness requirement, a symbol clock frequency tolerance, a transmit center frequency tolerance, a transmitter modulation accuracy requirements (e.g., a transmit center frequency leakage and a transmitter constellation error), an inter-frame spacing, a format for non-HT duplicate packet generation, or a combination thereof.

Other aspects, advantages, and features of the present disclosure will become apparent after review of the application, including the following sections: Brief Description of the Drawings, Detailed Description, and the Claims.

V. BRIEF DESCRIPTION OF THE DRAWINGS

VI. DETAILED DESCRIPTION

Particular embodiments of the present disclosure are described below with reference to the drawings. In the description, common features are designated by common reference numbers throughout the drawings.

A station may generate, transmit, or a combination thereof, a data packet (e.g., including a very high throughput (VHT) data symbol or a (PPDU)) via a television (TV) high throughput (TVHT) bandwidth channel. Generation, transmission, or a combination thereof, of the data packet may be based on one or more parameters or comply with one or more constraints associated with or including a spectral flatness, a transmit center frequency tolerance, a symbol clock frequency tolerance, a transmit center frequency leakage, a transmitter constellation error, and one or more inter-frame spacing (timing) parameters. For example, the one or more parameters or constraints may be included in an Institute of Electrical and Electronics Engineers (IEEE) 802.11af standard.

TVHT design is based on defining 144 orthogonal frequency division multiplexing (OFDM) tones in 6 megahertz (MHz) and 8 MHz channel units and using up to tone 58 on each side of a direct current (DC) tone for data and pilots, matching very high throughput (VHT) 40 MHz physical layer (PHY) parameters. A 7 MHz channel unit has 168 tones (same bandwidth and DC factor as the 6 MHz channel).

TVHT physical layer (PHY) parameters may include a combination of one, two, or four frequency segments. For example, the TVHT PHY may include a mandatory mode (e.g., a basic channel unit (BCU)) for transmissions using one frequency segment (e.g., Mode 1). The TVHT PHY may also include one or more optional modes (e.g., multi-BCUs) for transmissions using multiple segments. Transmissions using multiple segments may include transmission using two contiguous frequency segments (e.g., Mode 2C), four contiguous frequency segments (e.g., Mode 2N), two non-contiguous frequency segments (e.g., Mode 4C), or two non-contiguous frequency sections (e.g., Mode 4N). Each frequency section includes two contiguous frequency segments.

Figure 1:
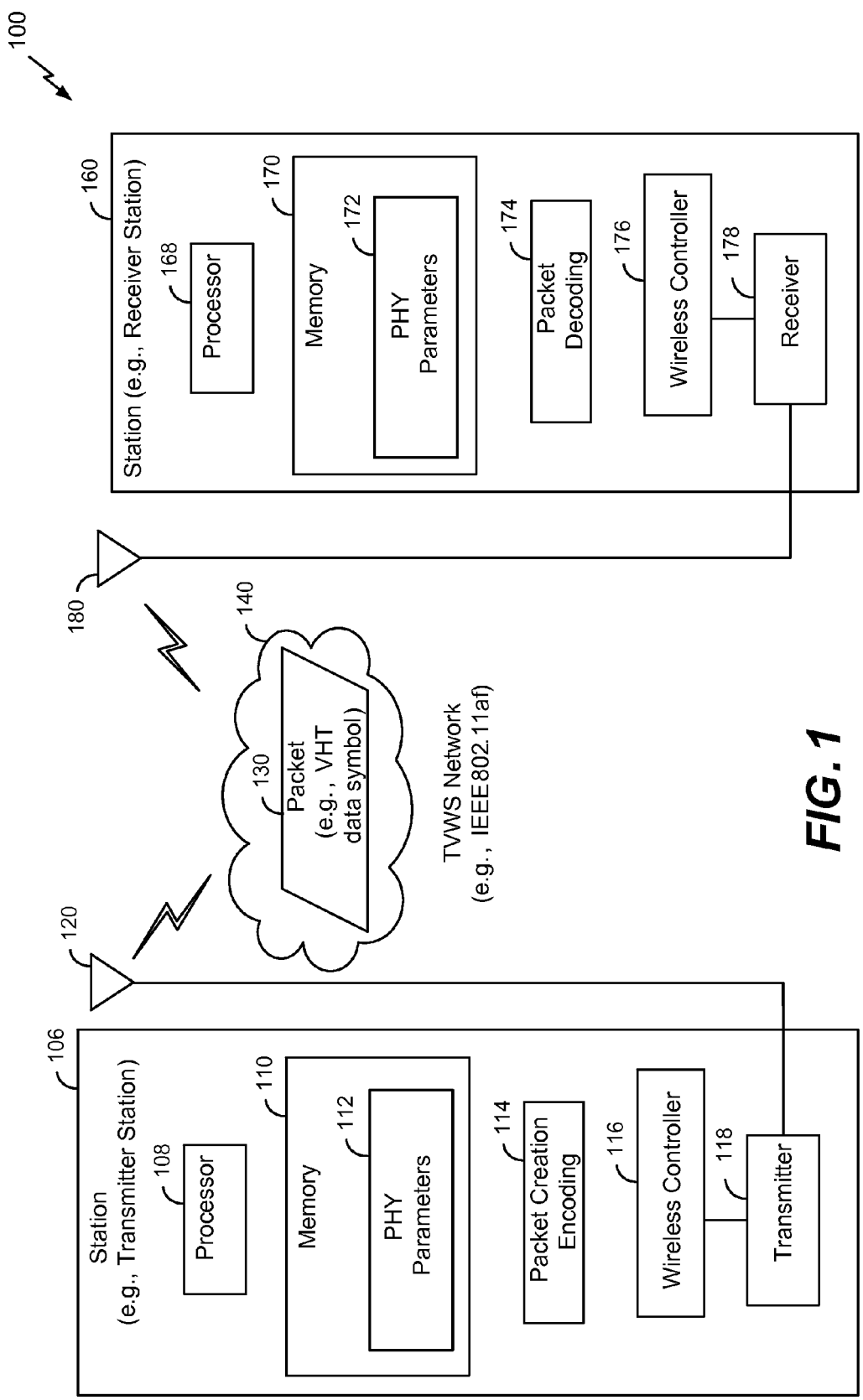
FIG. 1 is a diagram of an illustrative embodiment of a system that communicates data via a TVWS network.

FIG. 1 is a diagram of a particular embodiment of a system 100 that is operable to communicate data via a wireless network, such as the TVWS network 140. The system 100 includes a station 106 (e.g., a transmitter station) and another station 160 (e.g., a receiver station). The transmitter station 106 may be configured to transmit a packet 130 to the receiver 160 via the TVWS network 140. It should be noted that although a single transmitter and a single receiver are shown in FIG. 1, alternate embodiments include more than one transmitter and more than one receiver. It should be noted that although a dedicated transmitter station 106 and a dedicated receiver station 160 are shown in FIG. 1, some devices (e.g., transceivers or mobile communication devices that include a transceiver) may be capable of both packet transmission as well as packet reception. Thus, the TVWS network 140 supports two-way communication.

The TVWS network 140 may operate in accordance with an IEEE 802.11af protocol. The TVWS network 140 may support communication via a plurality of channels (e.g., television channels). In a particular embodiment, a bandwidth of channels of the TVWS network 140 varies from 6 MHz to 8 MHz, depending on regulatory guidelines in the geographic region where the TVWS network 140 is located. For example, a channel bandwidth may be 6 MHz in the U.S., 8 MHz in Europe, and 7 MHz in some other regulatory domains. When data is communicated via the TVWS network 140, operating bandwidth used for communication in each of the channels may be less than or equal to the channel bandwidth of the channel. The values for bandwidth are 40/7.5=5.33 MHz for 6/7 MHz channels and 40/5.625=7.1111 MHz for 8 MHz channels. The transmitter station 106 may include a processor 108, a memory 110, a packet creation/encoding module 114, a wireless controller 116, and a transmitter 118. The processor 108 (e.g., a digital signal processor (DSP), an application processor, etc.) may be coupled to the memory 110. In a particular embodiment, the processor 108 includes logic (e.g., hardware and/or circuit elements) to generate the packet 130 to be transmitted via the TVWS network 140. Alternatively, the packet 130 may be generated, encoded, or a combination thereof, by the packet creation/encoding module 114 (e.g., hardware, circuit elements, software, or a combination thereof).

The memory 110 may be a non-transitory computer readable storage medium that stores data, instructions, or both. The memory 110 may include PHY parameters 112 associated with the TVWS network 140 (e.g., networks that may be compatible with the IEEE 802.11af standard) and the TVWS transmissions (e.g., transmissions that comply with the IEEE 802.11af standard). The PHY parameters 112 may enable the transmitter station 106 to transmit the packet 130 (e.g., a protocol data unit (PPDU) or a VHT data symbol) via the TVWS network 140. For example, the PHY parameters 112 may be associated with spectral flatness, transmit center frequency tolerance, symbol clock frequency tolerance, transmit center frequency leakage, transmitter constellation error, and one or more inter-frame spacing (timing) parameters. In a particular embodiment, the PHY parameters 112 are stored in a table or an array in the memory 110, hardcoded in one or more circuits or components, or a combination thereof.

The memory 110 may also include instructions (not shown) that are executable by the processor 108 to cause the processor 108 to perform or more functions or methods as further described herein. For example, the instructions may include user applications, an operating system, other executable instructions, or a combination thereof. Further, the memory 110 may store the packet 130 generated by the processor 108 or generated by the packet creation/encoding module 114.

The wireless controller 116 may be coupled to the processor 108, the packet creation/encoding module 114, and the transmitter 118. The transmitter 118 may include a transceiver that enables the transmitter station 106 to wirelessly transmit data and wirelessly receive data. The transmitter 118 may be coupled to one or more antennas 120. Additionally, the transmitter station 106 may include one or more oscillators for use in generating a transmit center frequency, a symbol clock frequency, or a combination thereof, for use by the transmitter station 106. In a particular embodiment, the processor 108 may initiate sending of the packet 130 (via the wireless controller 116, the transmitter 118, and the antenna 120) from the transmitter station 106 to the receiver station 160 or other device via one or more channels of the TVWS network 140. Transmission of the packet 130 via the TVWS network 140 may comply with one or more constraints included in the IEEE 802.11af standard.

The transmitter station 106 may also include one or more transmit chains (not shown) configured to receive a data stream (e.g., payload from an application or the processor 108 of the transmitter station 106) and output a wireless transmission signal (e.g., a signal transmitted via the TVWS network 140), such as the data packet 130. The one or more transmit chains may each include a waveform generation circuit, a waveform preamble configuration circuit, an encoder circuit/module (e.g., the packet creation encoding module 114), an interleaver, a constellation mapper, a space-time frequency mapper circuit/module, an inverse discrete Fourier transform circuit/module, a formatter circuit/module, a digital-to-analog converter, a transmitter radio frequency (RF) circuit/module (e.g., the wireless controller 116 or transmitter 118), a primary carrier modulator, an antenna, or a combination thereof. One or more of the components of the transmit chain may be configured to receive a clock signal. When the transmitter station 106 includes multiple transmit chains, the multiple transmit chains may include a common encoder (e.g., a single encoder circuit/module) to provide a signal to a stream parser. The steam parser may provide a signal for each transmit chain of the multiple transmit chains via one or more interleavers. Each interleaver may correspond to a particular transmit chain and provide the signal to the particular transmit chain.

The receiver station 160 may include a station, an access point, or another device configured to receive one or more data packets (e.g., VHT data symbols), such as the packet 130 sent via the TVWS network 140. The receiver station 160 may include a processor 168, a memory 170, a packet decoding module 174, a wireless controller 176, and a receiver 178. The processor 168 (e.g., a digital signal processor (DSP), an application processor, etc.) may be coupled to the memory 170. In a particular embodiment, the processor 168 includes logic (e.g., hardware and/or circuit elements) to process the packet 130 received at the receiver station 160 to be transmitted via the TVWS network 140. Alternatively, the packet 130 may be decoded (e.g., deconstructed) by the packet decoding module 174 (e.g., hardware, circuit elements, software, or a combination thereof).

The memory 170 may be a non-transitory computer readable storage medium that stores data, instructions, or both. The memory 170 may include PHY parameters 172 associated with the TVWS network 140 (e.g., networks that may be compatible with the IEEE 802.11af standard) and reception of TVWS transmissions (e.g., transmissions that comply with the IEEE 802.11af standard). The PHY parameters 172 may enable the receiver station 160 to receive the packet 130 (e.g., a protocol data unit (PPDU) or a VHT data symbol) via the TVWS network 140 and to process the received packet 130. For example, the PHY parameters 172 may be associated with spectral flatness, transmit center frequency tolerance, symbol clock frequency tolerance, transmit center frequency leakage, transmitter constellation error, and one or more inter-frame spacing (timing) parameters. In a particular embodiment, the PHY parameters 172 are stored in a table or an array in the memory 170, hardcoded in one or more circuits or components, or a combination thereof.

The memory 170 may also include instructions (not shown) that are executable by the processor 168 to cause the processor 168 to perform or more functions or methods as further described herein. For example, the instructions may include user applications, an operating system, other executable instructions, or a combination thereof. Further, the memory 170 may store the packet 130 or processed data from the packet 130 generated by the processor 108 or the packet decoding module 174.

The wireless controller 176 may be coupled to the processor 168, the packet decoding module 174, and the receiver 178. The receiver 178 may include a transceiver that enables the receiver station 160 to wirelessly transmit data and wirelessly receive data. The receiver 178 may be coupled to one or more antennas 180. Additionally, the receiver station 160 may include one or more oscillators for use in generating one or more clock signals or frequency signals. In a particular embodiment, the receiver station 160 may receive the packet 130 (via the antenna 180, the receiver 178, and the wireless controller 176) from the transmitter station 106 or other device via one or more channels of the TVWS network 140. Transmission and reception of the packet 130 via the TVWS network 140 may comply with one or more constraints included in the IEEE 802.11af standard.

The receiver station 160 may also include one or more receive chains (not shown) configured to generate payload data based a received wireless transmission signal (e.g., a signal received via the TVWS network 140), such as the packet 130. The one or more receive chains may each include a waveform decoding circuit, a waveform preamble identifier circuit, a decoder circuit/module (e.g., the packet decoding module 174), a deinterleaver, a channel estimator and equalizer circuit/module, a space-time-frequency detection/decoding circuit/module, a time/frequency sync. circuit/module, a discrete Fourier transform circuit/module, a deformatter circuit/module, an analog-to-digital converter, a receiver radio frequency (RF) circuit/module (e.g., the wireless controller 176 or receiver 178), a primary carrier demodulator, an antenna, or a combination thereof. One or more of the components of the receive chain may be configured to receive a clock signal. When the receiver station 160 includes multiple receive chains, the receiver station 160 may include a common multiple input/multiple output (MIMO) detector and each of the multiple receive chains may provide a signal to a stream de-parser. The steam de-parser may provide a signal (e.g., a single signal) to a decoder (e.g., a decoder that is common to each of the multiple receive chains).

During operation, the processor 108, the packet creation/encoding module 114, or a combination thereof, of the transmitter station 106 may create (e.g., generate) and encode the packet 130 based on the PHY parameters 112. The packet 130 may be transmitted by the transmitter station 106 via the transmitter 118 and the one or more antennas 120. The packet 130 may be transmitted to the receiver station 160 via the TVWS network 140. Generation, transmission, or a combination thereof, of the packet 130 via the TVWS network 140 may comply with one or more parameters or constraints included in the IEEE 802.11af standard, as described further herein.

In a particular embodiment, the transmitter station 106, the receiver station 160, or a combination thereof, may include one or more oscillators, as described with reference to FIG. 12. The one or more oscillators may be configured to generate a transmit frequency having a transmit center frequency, a symbol clock frequency having symbol clock center frequency, or a combination thereof.

The system 100 may thus provide a transmitter configured to transmit a data packet (e.g., a data symbol or PPDU) via a television bandwidth channel of the TVWS network 140 and a receiver to receive the data packet. The packet may conform to and comply with one or more standards, such as the IEEE 802.11af standard. For example, one or more parameters or constraints included in the IEEE 802.11af standard may include a spectral flatness requirement, a symbol clock frequency tolerance, a transmit center frequency tolerance, a transmitter modulation accuracy requirements (e.g., a transmit center frequency leakage and a transmitter constellation error), an inter-frame spacing, a format for non-HT duplicate packet generation, or a combination thereof, as further described herein.

Spectral Flatness

Spectral flatness is a measure of a deviation of one or more channels (e.g., one or more sub-carriers) from an average power. Spectral flatness may be determined using binary phase-shift keying (BPSK) modulated packets. The spectral flatness is based on bandwidth (e.g., an amount of bandwidth) used to transmit a signal (e.g., a symbol).

Referring to TABLE 1 (below), maximum transmit spectral flatness deviations are shown for a transmission of a TVHT data symbol using a frequency segment having a TVHT format or a non-HT duplicate format. Referring to the column headings of TABLE 1, for a given "Format," an average constellation energy of a BPSK modulated subcarrier i in a transmitted TVHT data symbol, with an index listed as "Tested Subcarrier Indices," is within a range, e.g., a "Maximum Deviation," of an average of an average constellation energy over subcarrier indices listed as "Averaging Subcarrier Indices." For example, referring to the TVHT format entry of TABLE 1, an average constellation energy of a BPSK modulated subcarrier, with an index within −42 to −2 or +2 to +42 (e.g., the "Tested Subcarrier Indices" of TABLE 1), in a transmitted TVHT data symbol, is within a range of +4 to −6 (e.g., the "Maximum Deviation" of TABLE 1) of an average of multiple average constellation energies over subcarrier indices included in −58 to −43 and +43 to +58 (e.g., the "Averaging Subcarrier Indices" of TABLE 1).

In a particular embodiment, a method performed by the transmitter station 106 includes transmitting a television (TV) very high throughput (TVHT) data symbol, where a transmission of the TVHT data symbol via a television (TV) high throughput (TVHT) bandwidth channel satisfies a spectral flatness constraint associated the TVHT data symbol. The spectral flatness constraint is satisfied when an average constellation energy value of a binary phase-shift keying (BPSK) modulated subcarrier, having an index included a first range of indices, of the TVHT data symbol is within a deviation range of an average of multiple average constellation energy values of multiple binary phase-shift keying (BPSK) modulated subcarriers each having an index included in a second range of indices.

TABLE 1

Maximum Transmit Spectral Flatness Deviations

| Format | Averaging Subcarrier Indices (inclusive) | Tested Subcarrier Indices (inclusive) | Maximum Deviation (dB) |
| --- | --- | --- | --- |
| TVHT | −42 to −2 and +2 to +42 | −42 to −2 and +2 to +42 −58 to −43 and +43 to +58 | ±4 +4/−6 |
| non-HT duplicate | −42 to −33, −31 to −6, +6 to +31, and +33 to +42 | −42 to −33, −31 to −6, +6 to +31, and +33 to +42 −43 to −58 and +43 to +58 | ±4 +4/−6 |

Referring to TABLE 1, a first range of indices listed as averaging subcarrier indices is inclusive, a second range of indices listed as tested subcarrier indices is inclusive, a deviation range of the maximum deviation is inclusive, or a combination thereof. In a particular embodiment, the indices listed as tested subcarrier indices are inclusive. For transmissions consisting of multiple contiguous or non-continuous frequency segments, each frequency segment shall meet the spectral flatness requirement for the transmission of one frequency segment.

Transmit Center Frequency Tolerance & Symbol Clock Frequency Tolerance

A transmit center frequency tolerance provides a limitation that a transmit center frequency can deviate from a desired (e.g., target) carrier frequency. A transmitter center frequency of a station (e.g., a transmitter device) may have an allowable deviation within (e.g., a tolerance of) a first range of −25 parts per million (ppm) to +25 ppm. In alternative embodiments, the first range may be +/−20 ppm, 32 ppm, 24 ppm, or 30 ppm.

Additionally, a symbol clock frequency tolerance provides a limitation (e.g., a maximum amount) that a symbol clock frequency can deviate from a desired (e.g., target) clock frequency. The symbol clock frequency may have a tolerance within a second range of −25 ppm to +25 ppm. The first range, the second range, or a combination thereof, may be inclusive. The transmit center frequency and the symbol clock frequency carrier clock frequency for one or more antennas of the station and one or more frequency segments (including one or more TVHT bandwidth channels) of the station may be derived from a common reference oscillator. The one or more antennas may each be coupled to or include a corresponding transmit chain including hardware, software, or a combination thereof.

Transmit Center Frequency Leakage

Transmit center frequency leakage is associated with unwanted energy at the center frequency of a modulated signal. The transmit center frequency leakage may cause problems for receivers. The transmit center frequency leakage is defined according to one or more conditions depending upon the position of a local oscillator (LO) (carrier).

For transmissions using one frequency segment, two contiguous frequency segments, or four contiguous frequency segments, when a radio frequency (RF) LO is at a center of the transmitted PPDU bandwidth channel, a power measured at the center of a transmission bandwidth using a resolution bandwidth (e.g., a resolution bandwidth of 6/144 or 8/144 MHz) may not exceed an average power per-subcarrier of the transmitted PPDU, or equivalently may not exceed (P−10 $\log_{10}(N_{ST})$), where P is the total transmit power and $N_{ST}$ is a number of subcarriers per frequency segment. Additionally, for transmissions using one frequency segment, two contiguous frequency segments, or four contiguous frequency segments, when the RF LO is not at the center of the transmitted PPDU bandwidth, the power measured at a location of the RF LO may not exceed a maximum of −20 dBm (an abbreviation of a power ratio in decibels (dB) of a measured power referenced to one milliwatt (mW)) or a sum of −32 dB and the total transmit power, or equivalently may not exceed max(P−32, −20) (e.g., a higher of P−32 and −20), where P is the total transmit power. The power measured at the location of the RF LO may be measured using a resolution bandwidth (e.g., the resolution bandwidth of 6/144 or 8/144 MHz).

For transmissions using two non-contiguous frequency segments or two non-contiguous frequency sections where each frequency section includes of two contiguous frequency segments and where the RF LO falls outside both frequency segments, the RF LO shall follow the spectral mask constraints (e.g., spectral mask requirements). For example, one or more constraints of the spectral mask constraints may be included in a transmit spectrum section of the IEEE 802.11ac standard.

Transmitter Constellation Error

Transmitter constellation error is associated with a modulation accuracy of a transmitter station. For transmissions using one or more modes defined in TVHT PHY, constraints for transmit constellation root mean square (RMS) error is defined in the IEEE 802.11af standard. For example, the constraints for a transmit constellation RMS error may be the same as the transmitter constellation error constraint included in a transmitter constellation error section of the IEEE 802.11ac standard.

For transmissions using a non-high throughput (non-HT) duplicate transmission, each half of a channel bandwidth associated with the transmission complies with a particular transmitter constellation error constraint. For example, the particular transmitter constellation error constraint may be included in a transmitter constellation error section of the IEEE 802.11b standard. Each half of the channel bandwidth associated with the transmissions using the non-HT duplicate transmission may comply with the transmitter constellation error constraint.

Inter-Frame Spacing (Timing) Parameters

Inter-frame spacing (e.g., a spacing value between two frames) may include one or more parameters, such as a clear channel assessment (CCA) time, an air propagation time, a slot time, or a short inter-frame space (SIFS). See TABLE 2—Inter-frame Spacing Parameters.

TABLE 2

Inter-frame Spacing Parameters

| | For 6 MHz or 7 MHz | For 8 MHz |
|---|---|---|
| CCA Time | 15 μs | 11.25 μs |
| Air Propagation Time | 6 μs | 6 μs |
| Slot Time | 26 μs | 26 μs |
| SIFS | 115, 120, or 121 μs | 86, 90, or 91 μs |

Figure 2:
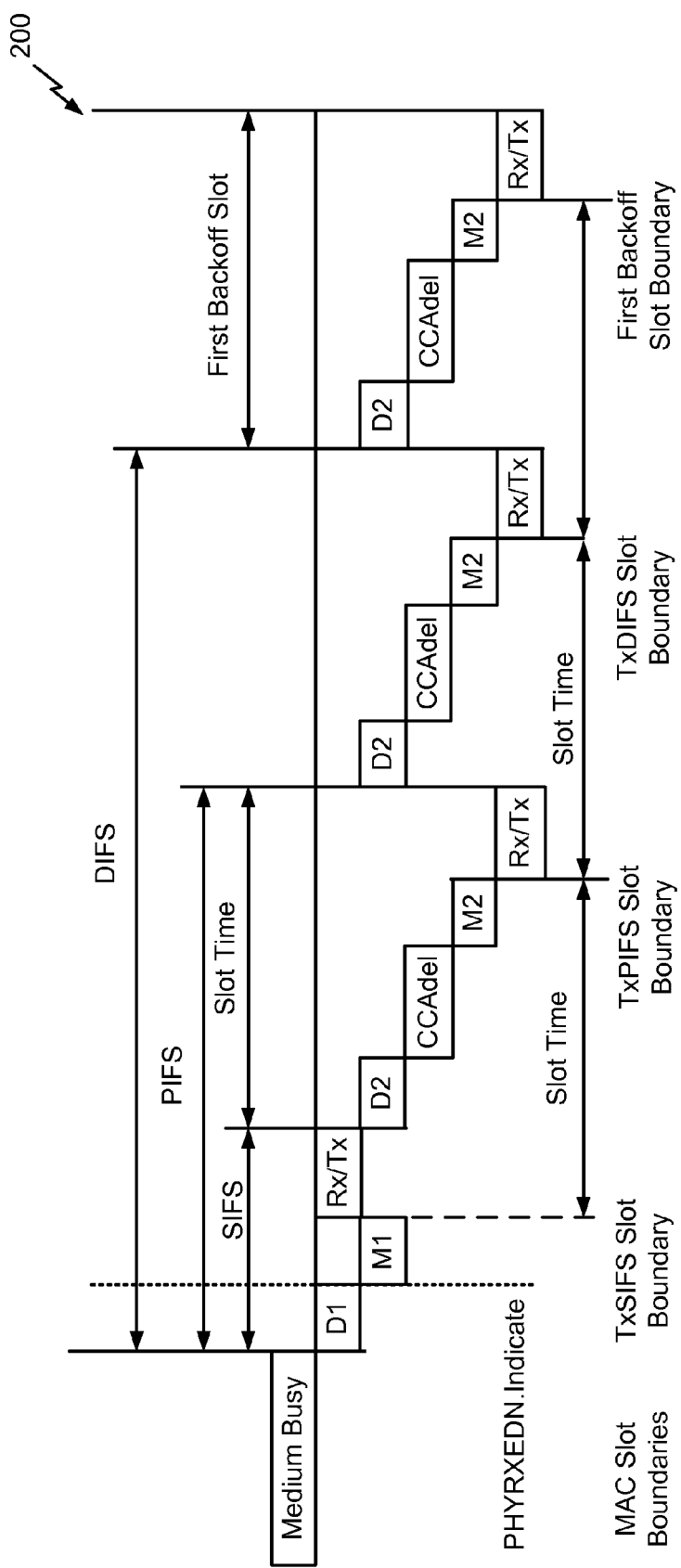
FIG. 2 is a timing diagram of associated with transmission of a frame (e.g., including a PPDU, a data symbol, or a combination thereof) based on one or more inter-frame spacing parameters associated with TVWS networks.

The slot time and SIFS values may be calculated based in part on exemplary timing intervals as shown in FIG. 2. Referring to FIG. 2, a timing diagram 200 associated with transmission of a frame (e.g., including a PPDU, a data symbol, or a combination thereof) based on one or more inter-frame spacing parameters associated with TVWS networks is shown. One or more aspects of the timing diagram 200 are based on one or more PHY parameters or constraints, such as the PHY parameters 112, 172 of FIG. 1. For example, FIG. 2 defines various timing periods associated with carrier sense multiple access (CSMA) communication. Based on the timing diagram 200, a frame (e.g., including a PPDU, a data symbol, or a combination thereof) of a transmitted packet is associated with timing including a distributed coordination function (DCF) inter-frame spacing (DIFS) period and a first backoff slot period. The DIFS period includes a point coordination function (PCF) inter-frame spacing (PIFS) period. The PIFS period includes a SIFS period and a slot time period. Processing, turnaround, and air propagation delays may also be present.

Additionally, the CCA time includes a time (in microseconds) that a CCA mechanism of the transmitter station has access to the medium within each time slot to determine whether the medium is busy or idle. The air propagation time (in microseconds) is half of an amount of time for a signal to cross a distance between the most distant allowable stations that are slot synchronized. For example, the distance may be a maximum distance between the most distant allowable stations that are slot synchronized.

In a particular embodiment, a method includes the transmitter station 106 transmitting a very high throughput (VHT) data symbol, where one or more inter-frame timing parameters are used to transmit the VHT data symbol via a TVHT bandwidth channel. The one or more inter-frame timing parameters include a clear channel assessment (CCA) time of 15 microseconds (μs) for a 6 megahertz (MHz) bandwidth channel or a 7 MHz bandwidth channel, 11.25 μs for an 8 MHz bandwidth channel, or a combination thereof. A CCA time may represent an upper bound or a threshold (e.g., a limit) for a clear channel assessment that is sufficiently accurate. For example, a CCA time of 15 μs may indicate that detection of a signal within a time period less than or equal to 15 μs is ninety percent accurate. In a particular embodiment, CCA time is less than 15 μs for the 6 MHz bandwidth channel or the 7 MHz bandwidth channel, is less than 11.25 μs for the 8 MHz bandwidth channel, or a combination thereof. The CCA time may be used to calculate a short inter-frame space (SIFS) time, as further described herein.

In another particular embodiment, the one or more inter-frame timing parameters include a short inter-frame space (SIFS) time of 120 μs for a 6 MHz bandwidth channel or for a 7 MHz bandwidth channel, 90 μs for an 8 MHz bandwidth channel, or a combination thereof. For example, the SIFS time may be equal to 120 μs for the 6 MHz bandwidth channel or for the 7 MHz bandwidth channel. As another example, the SIFS time may be equal to 90 μs for an 8 MHz bandwidth channel.

Inter-frame spacing (e.g., a spacing value between two frames) may include one or more options having the following parameter combinations. For example, the parameter combinations may include a first inter-frame spacing option, a second inter-frame spacing option, or a third inter-frame spacing option, as described herein.

The first inter-frame spacing option may include the slot time for the TVHT PHY of 68 microseconds (μs) for 6 MHz and 7 MHz operation and 51 μs for 8 MHz operation. The first inter-frame spacing option may include a short inter-frame spacing time (SIFS) for the TVHT PHY of 120 μs for 6 MHz and 7 MHz operation and 90 μs for 8 MHz operation. These values may be obtained by scaling 11n/ac values by the down-clocking factor (e.g., a down-clocking factor of 7.5 for 6 MHz and 7 MHz or 5.625 for 8 MHz).

The second inter-frame spacing option may include a slot time for the TVHT PHY of 59 μs for 6 MHz and 7 MHz operation and 46 μs for 8 MHz operation. The second inter-frame spacing option may also include a short inter-frame spacing time (SIFS) for the TVHT PHY of 121 μs for 6 MHz and 7 MHz operation and 91 μs for 8 MHz operation.

Alternately, the second inter-frame spacing option may include a slot time for the TVHT PHY that is 26 μs for 6 MHz and 7 MHz operation and 21 μs for 8 MHz operation. The second inter-frame spacing option may include a SIFS for the TVHT PHY that is 115 μs for 6 MHz and 7 MHz operation and 86 μs for 8 MHz operation.

The slot time and SIFS values of the first inter-frame spacing option, the second inter-frame spacing option, the third inter-frame spacing option, or a combination thereof, may be calculated based in part on exemplary timing intervals as shown in FIG. 2. For example, the slot time and the SIFS values included in the third inter-frame spacing option may be calculated based in part on one or more values and assumptions, such as one or more values and assumptions associated with an air propagation time, a Rx physical layer convergence procedure (PLCP) delay, a MAC Processing delay, a Tx PLCP delay, a Tx ramp on time, an RxTX switch time, a TX RF delay, an Rx RF delay, or a CCA time.

The air propagation time (aAirPropagationTime) may be twice the propagation time (in microseconds) for a signal to cross a distance between a most distant allowable station that is slot synchronized. For example, assuming 300 and 900 meters range associated with IEEE 802.11n/ac and IEEE 802.11ah respectively, corresponding values of the air propagation time may be 2 μs and 6 μs.

The Rx PLCP delay (aRxPLCPDelay), the MAC Processing delay (aMACProcessingDelay), and the Tx PLCP delay (aTxPLCPDelay) include digital processing delays and that may depend on a digital clock rate. The Rx PLCP delay (aRxPLCPDelay), the MAC Processing delay (aMACProcessingDelay), and the Tx PLCP delay (aTxPLCPDelay) may be scaled by 40/5.33 (e.g., 7.5) or 40/7.11 (e.g., 5.625) for 6 MHz/7 MHz and 8 MHz, respectively. A MAC processing time for a slot may set to zero because the MAC calculation can be done prior to (e.g., before) a transmission.

The Tx ramp on time (aTxRampOnTime) and the RxTX switch time (aRxTxSwitchTime) may be assumed to be the same as in IEEE 802.11n/ac and IEEE 802.11ah. The TX RF delay (aTxRFDelay) and the Rx RF delay (aRxRFDelay), assuming a same filter order as in IEEE 802.11n/ac and IEEE 802.11ah, each increase by 20/.5333 (e.g., 37.5) due to bandwidth scaling as compared to IEEE 802.11n/ac and IEEE 802.11ah. The CCA time may be 15 μs for a 6 MHz bandwidth channel or a 7 MHz bandwidth channel.

Furthermore, it may be assumed that a Tx filter will be approximately 2 times longer than in IEEE 802.11n/ac and IEEE 802.11ah to meet the spectral mask constraints of IEEE 802.11af. For example, the spectral masks constraints may include requirements based on one or more regulatory domains.

Exemplary values that used in conjunction in the third inter-frame spacing option are provided with reference to TABLES 3 and 4. In TABLE 3, SIFS are in units of microseconds (μs) and, in TABLE 4, slot times are in units of microseconds (μs).

TABLE 3

SIFS Related Parameters

|  | For 6 MHz or 7 MHz | For 8 MHz |
|---|---|---|
| ARxRFDelay | 1.875 | 1.4 |
| ARxPLCPDelay | 93.75 | 70.31 |
| AMACProcessingDelay | 7.5 | 5.625 |
| aRxTxTurnaroundTime (aTxPLCPDelay + aRxTxSwitchTime + aTxRampOnTime + aTxRFDelay) | 11.75 (7.5 + 0.25 + 0.25 + 3.75) | 8.93 (5.625 + 0.25 + 0.25 + 2.81) |
| SIFS | 115 | 86 |

TABLE 4

Slot time Related Parameters

|  | For 6 MHz or 7 MHz | For 8 MHz |
|---|---|---|
| CCA Time | 15 | 11.25 |
| Air Propagation Time | 6 | 6 |
| aMACProcessing Delay | 0 | 0 |
| aRxTxTurnaroundTime (aTxPLCPDelay + aRxTxSwitchTime + aTx RampOnTime + aTxRFDelay) | 4.25 (0 + 0.25 + 0.25 + 3.75) | 3.31 (0 + 0.25 + 0.25 + 2.81) |
| Slot Time | 26 | 21 |

Non-HT (Non-High-Throughput) Duplicate Transmission

A transmitted physical layer convergence procedure (PLCP) protocol data unit (PPDU) is a non-HT duplicate when a format parameter of a transmitter station (e.g., the transmitter station 106 of FIG. 1) is non-HT and when a non-HT modulation parameter is non-HT duplicate orthogonal frequency-division multiplexing (OFDM). A non-HT duplicate transmission mode may be used to extend a transmission range and to control a frame exchange. For a PPDU including multiple fields, such as a VHT-Signal (SIG)-A field, a VHT-Short Training Field (STF) field, a VHT-Long Training Field (LTF) field, a VHT-SIG-B field, a L-STF, L-LTF field, and a L-SIG field, the VHT-SIG-A field, the VHT-STF field, the VHT-LTF field, and the VHT-SIG-B field may not be transmitted and the L-STF, L-LTF field and the L-SIG field may be transmitted in the same way as in the TVHT transmission, with certain exceptions (e.g., for Rate and Length fields).

For a Mode 1 transmission using a non-HT duplicate format, the data field may be generated in accordance with a standard. For a single BCU transmission using a non-HT duplicate format, the data field may be generated as defined in IEEE 802.11n (see Clause 20 of the IEEE 802.11 standard). For multi-segment transmissions (e.g., Modes 2C, Mode 4C, Mode 2N, and Mode 4N), a data transmission (e.g., a data field) in each frequency segment may be the same as for the Mode 1 non-HT duplicate transmission.

Figure 3:
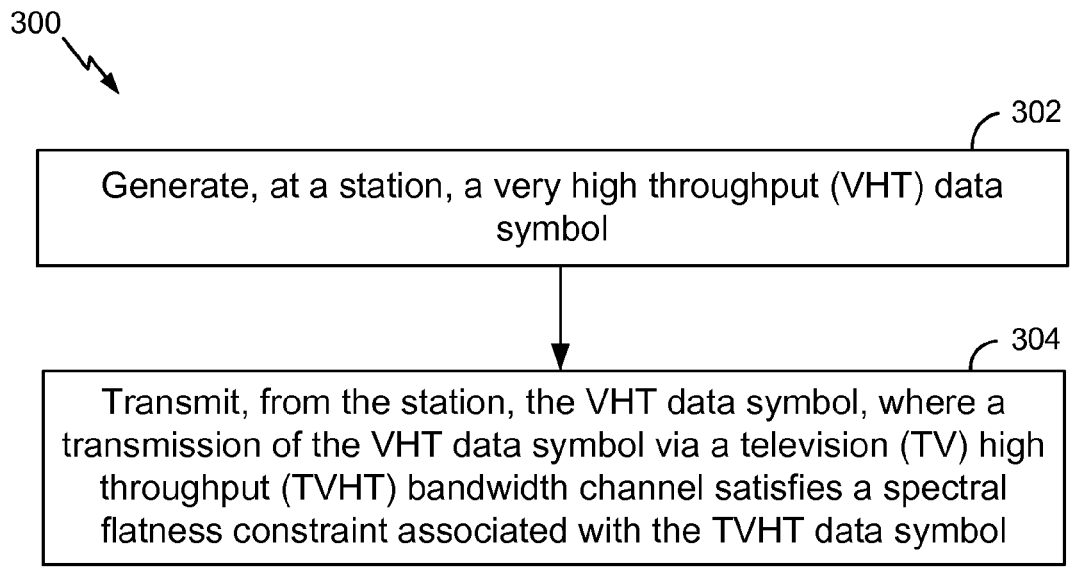
FIG. 3-11 depict illustrative methods of operating a station to transmit a VHT data symbol or PPDU via a TVHT bandwidth channel that is based on or complies with one or more PHY TVWS parameters or constraints.

Referring to FIG. 3, a flow diagram of a first illustrative embodiment of a method 300 to transmit a very high throughput (VHT) data symbol is depicted. For example, the very high throughput (VHT) data symbol may be included in the packet 130 of FIG. 1.

A very high throughput (VHT) data symbol may be generated at a station, at 302. For example, the station may include the station 106 of FIG. 1.

The VHT data symbol is transmitted from the station, at 304. The VHT data symbol may be transmitted from the station via a TVHT bandwidth channel. For example, the TVHT bandwidth channel may include a 6 MHz bandwidth channel, a 7 MHz bandwidth channel, an 8 MHz bandwidth channel, or a combination thereof. In a particular embodiment, a transmission of the VHT data symbol via the TVHT bandwidth channel satisfies a spectral flatness constraint associated with the VHT data symbol. For example, the spectral flatness constraint may be determined to be satisfied based on one or more of the values include in TABLE 1—Maximum Transmit Spectral Flatness Deviations.

In a particular embodiment, the spectral flatness constraint is satisfied when an average constellation energy value of a binary phase-shift keying (BPSK) modulated subcarrier, having an index included a first range of indices, of the TVHT data symbol is within a deviation range of an average of multiple average constellation energy values of multiple BPSK modulated subcarriers of the TVHT data symbol. The BPSK modulated subcarrier may have an index included in a first range of indices and each of the multiple BPSK modulated subcarriers may have an index included in a second range of indices.

Figure 4:
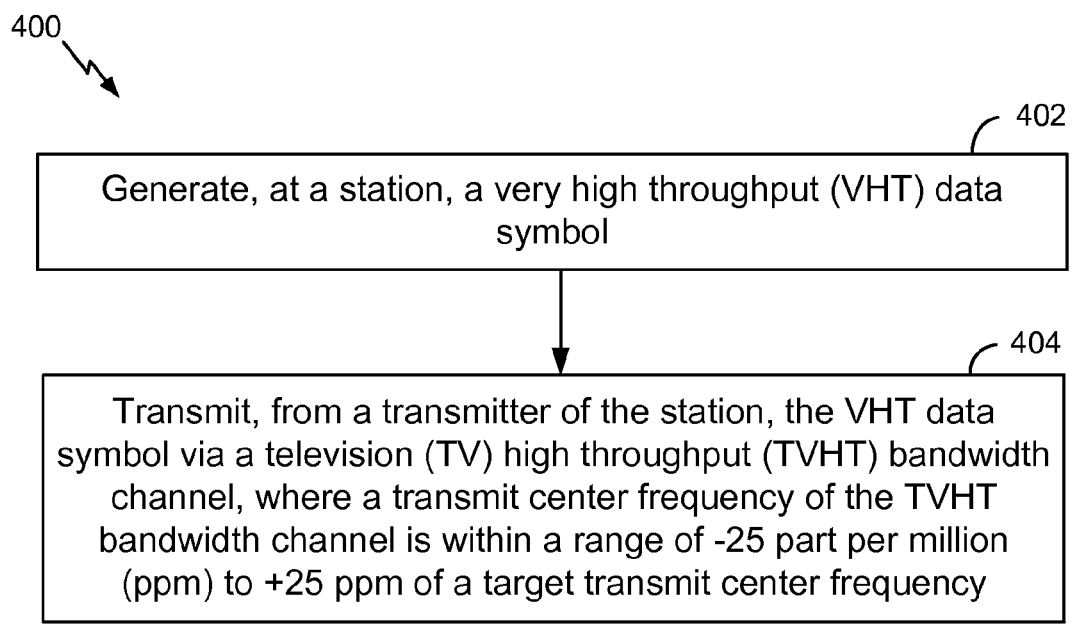

Referring to FIG. 4, a flow diagram of a second illustrative embodiment of a method 400 to transmit a very high throughput (VHT) data symbol is depicted. For example, the very high throughput (VHT) data symbol may be included in the packet 130 of FIG. 1.

A very high throughput (VHT) data symbol may be generated at a station, at 402. For example, the station may include the station 106 of FIG. 1.

The VHT data symbol is transmitted from the station via a television (TV) high throughput (TVHT) bandwidth channel, at 404. The TVHT bandwidth channel may include a 6 MHz bandwidth channel, a 7 MHz bandwidth channel, an 8 MHz bandwidth channel, or a combination thereof. A transmit center frequency of the TVHT bandwidth channel may be within a range of −25 parts per million (ppm) to +25 ppm of a target transmit center frequency. The transmit center frequency may be a center of the TVHT bandwidth channel via which the VHT data symbol is transmitted. In a particular embodiment, the range is inclusive.

Figure 5:
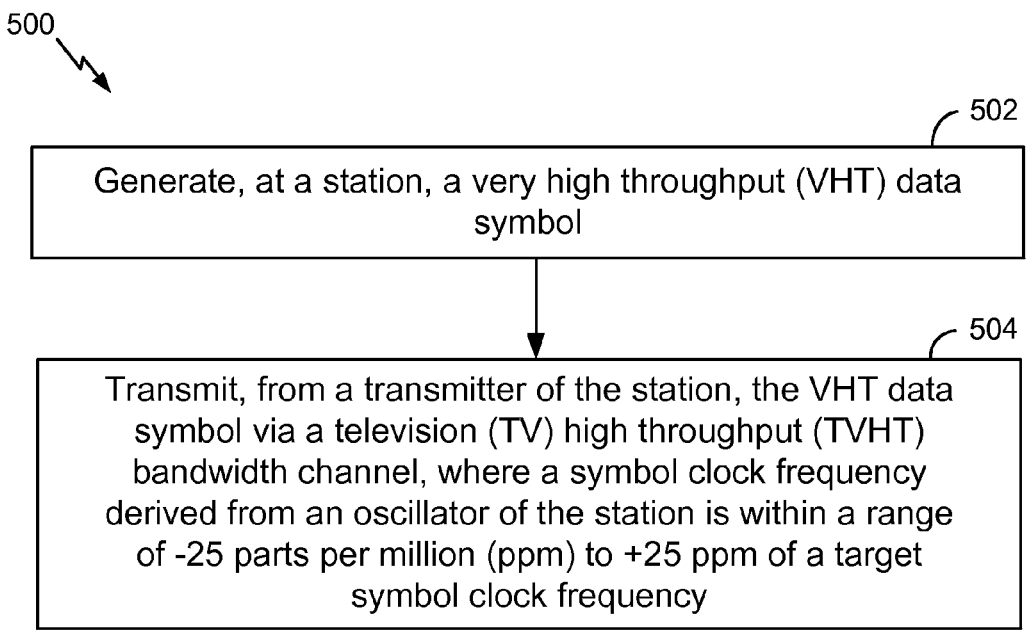

Referring to FIG. 5, a flow diagram of a third illustrative embodiment of a method 500 to transmit a very high throughput (VHT) data symbol is depicted. For example, the very high throughput (VHT) data symbol may be included in the packet 130 of FIG. 1.

A very high throughput (VHT) data symbol may be generated at a station, at 502. For example, the station may include the station 106 of FIG. 1.

The VHT data symbol is transmitted from the station via a TVHT bandwidth channel, at 504. The TVHT bandwidth channel may include a 6 MHz bandwidth channel, a 7 MHz bandwidth channel, an 8 MHz bandwidth channel, or a combination thereof. A symbol clock frequency derived from an oscillator of the station is within a range of −25 ppm to +25 ppm of a target symbol clock frequency. The symbol clock frequency may be a frequency used to generate or transmit the VHT data symbol. In a particular embodiment, the range is inclusive.

Figure 6:
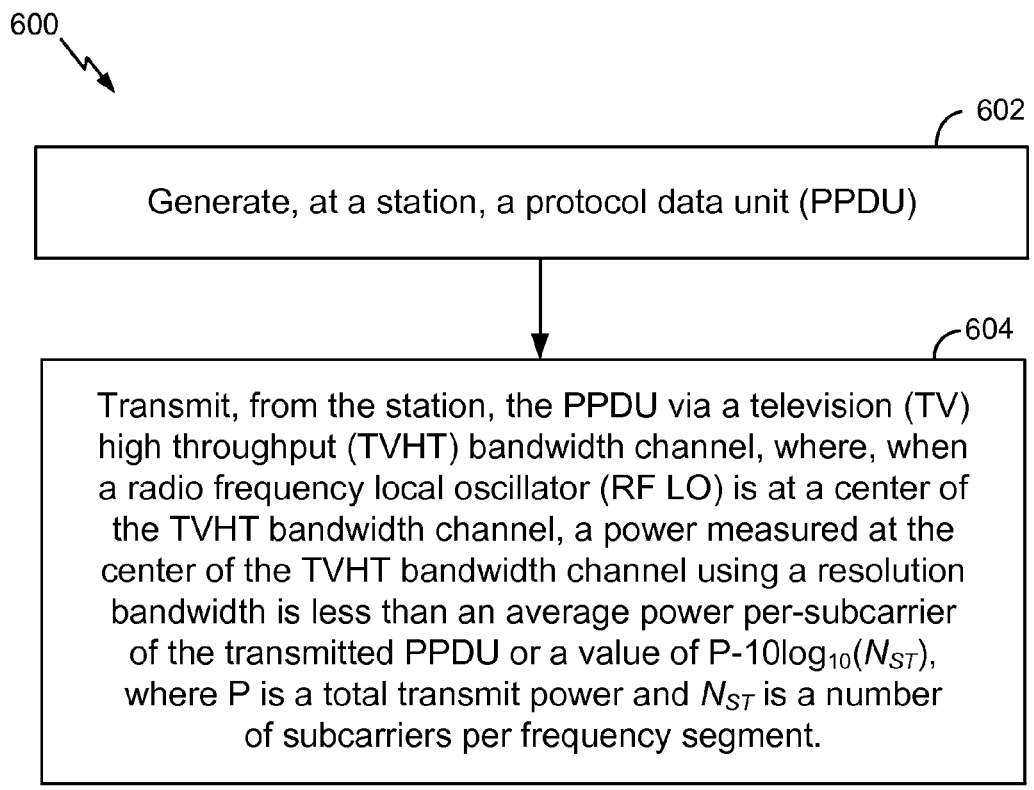

Referring to FIG. 6, a flow diagram of a fourth illustrative embodiment of a method 600 to transmit a protocol data unit (PPDU) is depicted. For example, the PPDU may be included in the packet 130 of FIG. 1.

A protocol data unit (PPDU) may be generated at a station, at 602. For example, the station may include the station 106 of FIG. 1. In a particular embodiment, the PPDU is associated with a transmission using one frequency segment, two contiguous frequency segments, or four contiguous frequency segments.

The PPDU is transmitted from the station via a television (TV) high throughput (TVHT) bandwidth channel, at 604. The TVHT bandwidth channel may include a 6 MHz bandwidth channel, a 7 MHz bandwidth channel, an 8 MHz bandwidth channel, or a combination thereof. When a radio frequency local oscillator (RF LO) is at a center of the TVHT bandwidth channel, a power measured at the center of the TVHT bandwidth channel using a resolution bandwidth is less than an average power per-subcarrier of the transmitted PPDU or a value of $P-10\log_{10}(N_{ST})$. P is a total transmit power and $N_{ST}$ is a number of subcarriers per frequency segment. The RF LO may be used to transmit the PPDU via the TVHT bandwidth.

In a particular embodiment, the frequency segment includes a 6 MHz bandwidth channel, a 7 MHz bandwidth channel, an 8 MHz bandwidth channel, or a combination thereof. In another particular embodiment, the resolution bandwidth is 6/144 MHz or 8/144 MHz.

Figure 7:
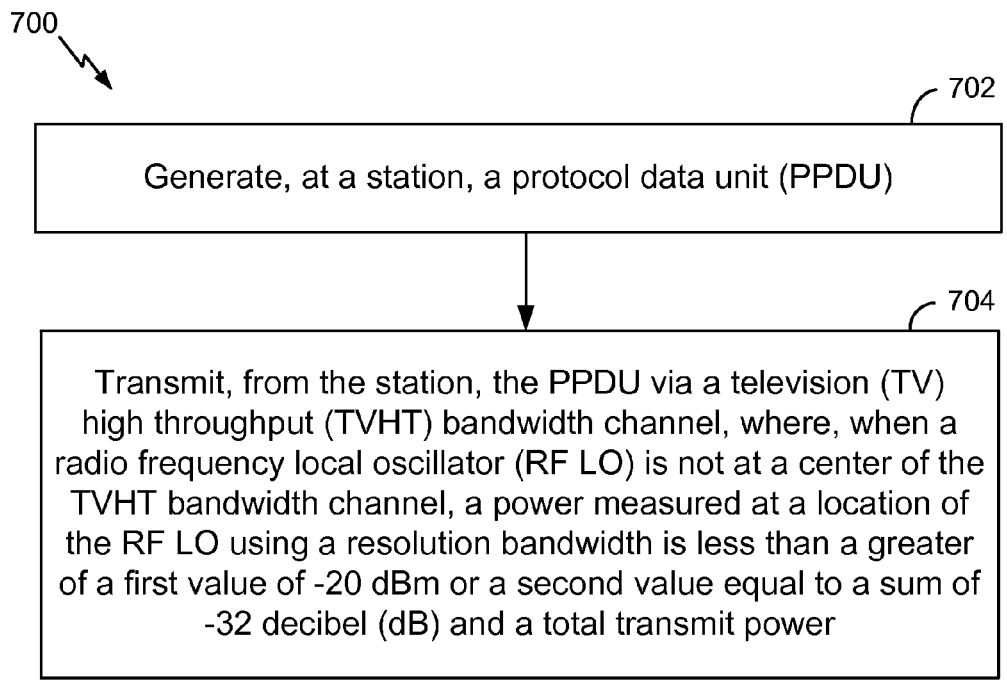

Referring to FIG. 7, a flow diagram of a fifth illustrative embodiment of a method 700 to transmit a protocol data unit (PPDU) is depicted. For example, the PPDU may be included in the packet 130 of FIG. 1.

A protocol data unit (PPDU) may be generated at a station, at 702. For example, the station may include the station 106 of FIG. 1. In a particular embodiment, the PPDU is associated with a transmission using one frequency segment, two contiguous frequency segments, or four contiguous frequency segments.

The PPDU is transmitted from the station via a television (TV) high throughput (TVHT) bandwidth channel, at 704. The TVHT bandwidth channel may include a 6 MHz bandwidth channel, a 7 MHz bandwidth channel, an 8 MHz bandwidth channel, or a combination thereof. When a radio frequency local oscillator (RF LO) is not at a center of the TVHT bandwidth channel, a power measured at a location of the RF LO using a resolution bandwidth is less than a greater of a first value of −20 dBm or a second value equal to a sum of −32 decibel (dB) and a total transmit power. The RF LO may be used to transmit the PPDU via the TVHT bandwidth.

In a particular embodiment, the frequency segment includes a 6 megahertz (MHz) bandwidth channel, a 7 MHz bandwidth channel, an 8 MHz bandwidth channel, or a combination thereof. In another particular embodiment, the resolution bandwidth is 6/144 MHz or 8/144 MHz.

Figure 8:
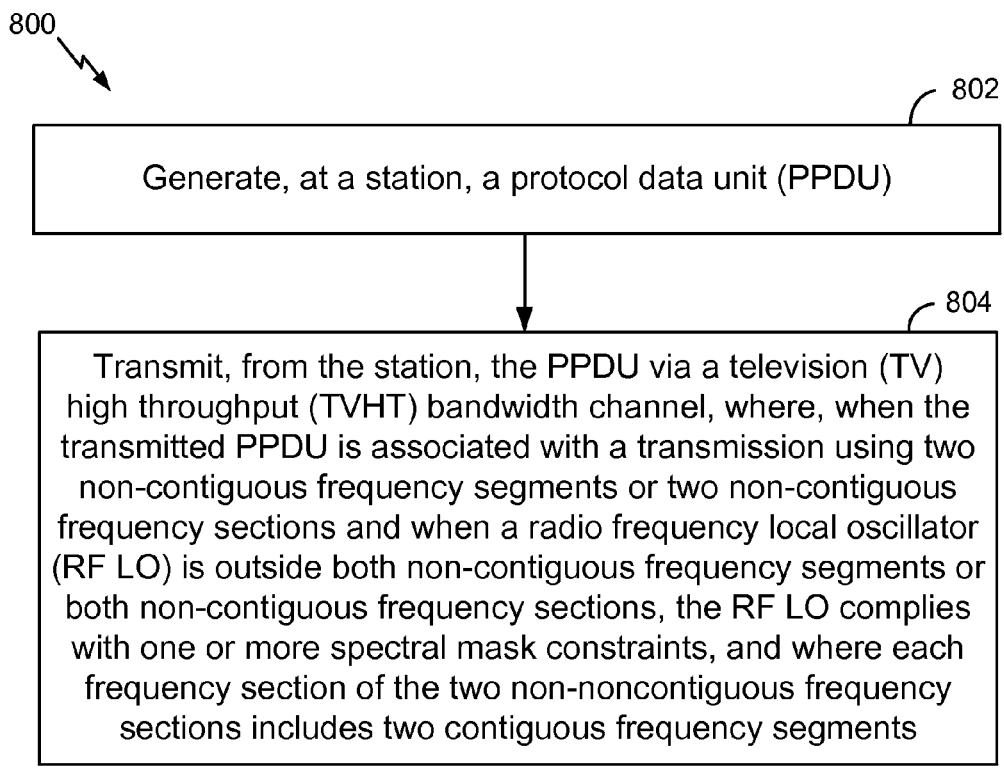

Referring to FIG. 8, a flow diagram of a sixth illustrative embodiment of a method 800 to transmit a protocol data unit (PPDU) is depicted. For example, the PPDU may be included in the packet 130 of FIG. 1.

A protocol data unit (PPDU) may be generated at a station, at 802. For example, the station may include the station 106 of FIG. 1. In a particular embodiment, the PPDU is associated with a transmission using one frequency segment, two contiguous frequency segments, or four contiguous frequency segments.

The PPDU is transmitted from the station via a television (TV) high throughput (TVHT) bandwidth channel, at 804. The TVHT bandwidth channel may include a 6 MHz bandwidth channel, a 7 MHz bandwidth channel, an 8 MHz bandwidth channel, or a combination thereof. When the transmitted PPDU is associated with a transmission using two non-contiguous frequency segments or two non-contiguous frequency sections and when a radio frequency local oscillator (RF LO) is outside both non-contiguous frequency segments or both non-contiguous frequency sections, the RF LO complies with one or more spectral mask constraints. Each frequency section of the two non-noncontiguous frequency sections includes two contiguous frequency segments. In a particular embodiment, the one or more spectral mask constraints are included in a transmit spectrum section of the IEEE 802.11ac standard.

Figure 9:
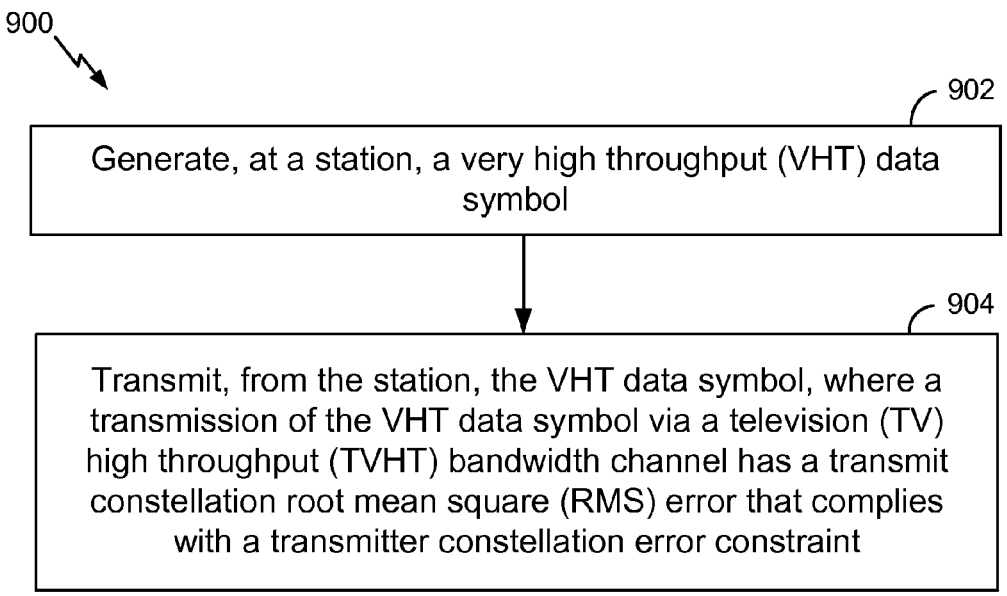

Referring to FIG. 9, a flow diagram of a seventh illustrative embodiment of a method 900 to transmit a very high throughput (VHT) data symbol is depicted. For example, the very high throughput (VHT) data symbol may be included in the packet 130 of FIG. 1.

A very high throughput (VHT) data symbol may be generated at a station, at 902. For example, the station may include the station 106 of FIG. 1.

The VHT data symbol is transmitted from the station via a television (TV) high throughput (TVHT) bandwidth channel, at 904. The TVHT bandwidth channel may include a 6 MHz bandwidth channel, a 7 MHz bandwidth channel, an 8 MHz bandwidth channel, or a combination thereof. The TVHT bandwidth channel has a transmit constellation root mean square (RMS) error that complies with a transmitter constellation error constraint. In a particular embodiment, the transmitter constellation error constraint is included in a transmitter constellation error section of the IEEE 802.11ac standard.

Figure 10:
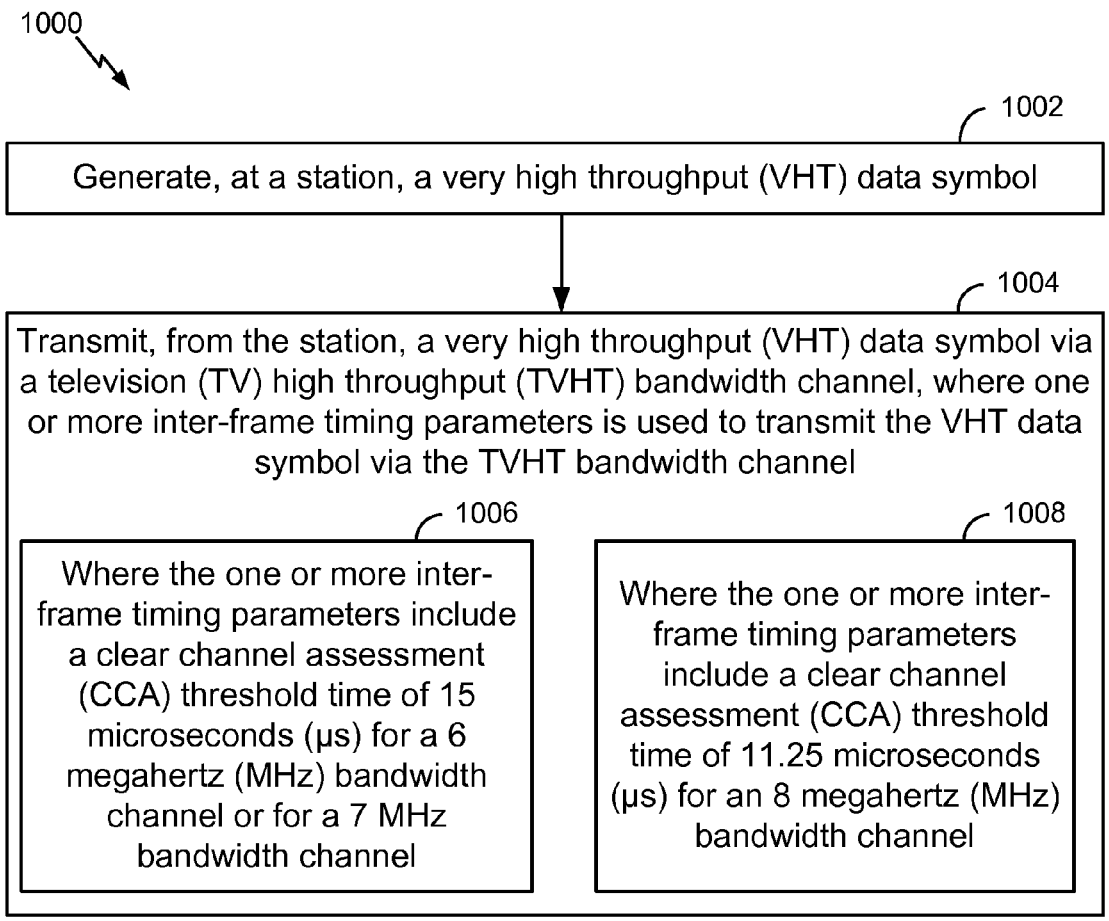

Referring to FIG. 10, a flow diagram of a eighth illustrative embodiment of a method 1000 to transmit a very high throughput (VHT) data symbol is depicted. For example, the very high throughput (VHT) data symbol may be included in the packet 130 of FIG. 1.

A very high throughput (VHT) data symbol may be generated at a station, at 1002. For example, the station may include the station 106 of FIG. 1.

The VHT data symbol is transmitted from the station via a television (TV) high throughput (TVHT) bandwidth channel, at 1004. The TVHT bandwidth channel may include a 6 MHz bandwidth channel, a 7 MHz bandwidth channel, an 8 MHz bandwidth channel, or a combination thereof. One or more inter-frame timing parameters are used to transmit the VHT data symbol via the TVHT bandwidth channel.

For example, at 1006, for a 6 MHz bandwidth channel or for a 7 MHz bandwidth channel, the one or more inter-frame timing parameters include a clear channel assessment (CCA) threshold time of 15 microseconds (μs). In a particular embodiment, a CCA time associated with the VHT data symbol transmitted via the 6 MHz bandwidth channel or the 7 MHz bandwidth channel is less than the CCA threshold time of 15 μs.

As another example, at 1008, for an 8 MHz bandwidth channel, the one or more inter-frame timing parameters include a clear channel assessment (CCA) time of 11.25 μs. In a particular embodiment, a CCA time associated with the VHT data symbol transmitted via the 8 MHz bandwidth channel is less than the CCA threshold time of 11.25 μs.

Figure 11:
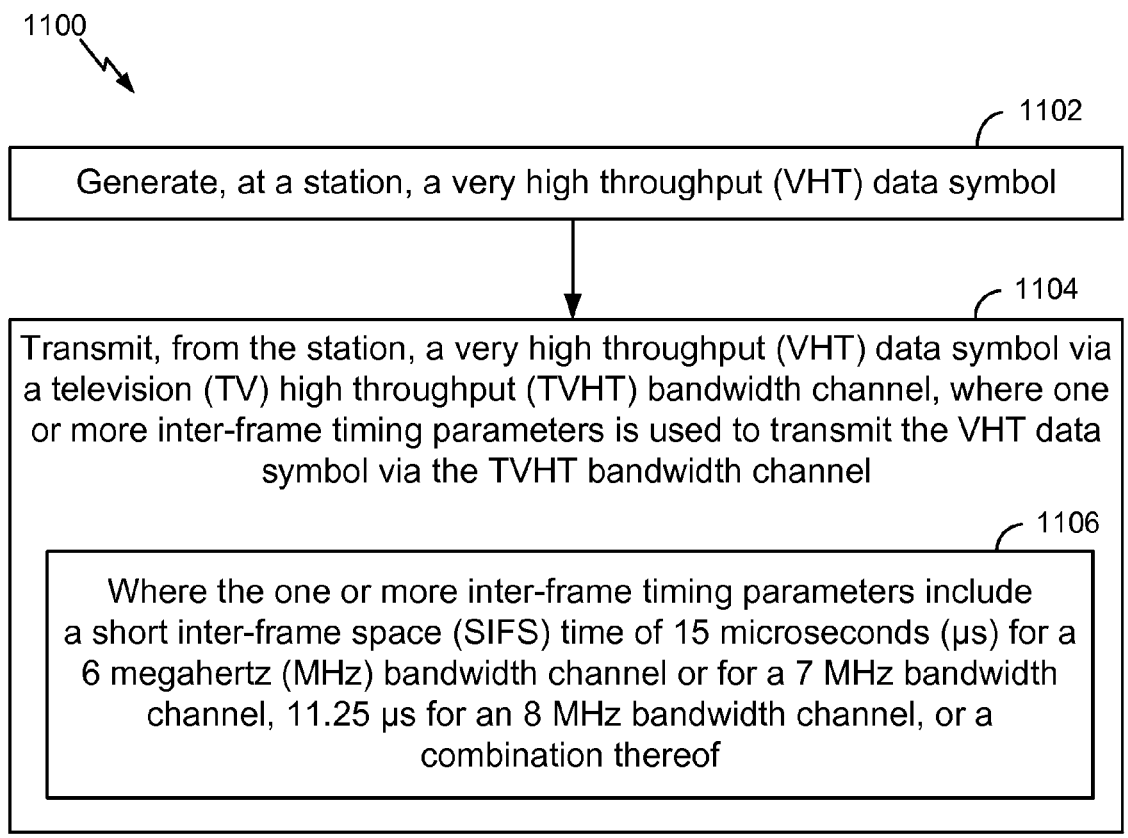

Referring to FIG. 11, a flow diagram of a ninth illustrative embodiment of a method 1100 to transmit a very high throughput (VHT) data symbol is depicted. For example, the very high throughput (VHT) data symbol may be included in the packet 130 of FIG. 1.

A very high throughput (VHT) data symbol may be generated at a station, at 1102. For example, the station may include the station 106 of FIG. 1.

The VHT data symbol is transmitted from the station via a television (TV) high throughput (TVHT) bandwidth channel, at 1104. The TVHT bandwidth channel may include a 6 MHz bandwidth channel, a 7 MHz bandwidth channel, an 8 MHz bandwidth channel, or a combination thereof. One or more inter-frame timing parameters are used to transmit the VHT data symbol via the TVHT bandwidth channel. At 1106, the one or more inter-frame timing parameters include a short inter-frame space (SIFS) time of 120 microseconds (μs) for a 6 MHz bandwidth channel or for a 7 MHz bandwidth channel, 11.25 μs for an 8 MHz bandwidth channel, or a combination thereof.

The method 300 of FIG. 3, the method 400 of FIG. 4, the method 500 of FIG. 5, the method 600 of FIG. 6, the method 700 of FIG. 7, the method 800 of FIG. 8, the method 900 of FIG. 9, the method 1000 of FIG. 10, the method 1100 of FIG. 11, or any combination thereof, may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, at least a portion of any of the method 300 of FIG. 3, the method 400 of FIG. 4, the method 500 of FIG. 5, the method 600 of FIG. 6, the method 700 of FIG. 7, the method 800 of FIG. 8, the method 900 of FIG. 9, the method 1000 of FIG. 10, the method 1100 of FIG. 11, or any combination thereof, may be implemented by a processor that executes instructions stored in a memory, as described with respect to FIG. 12.

Figure 12:
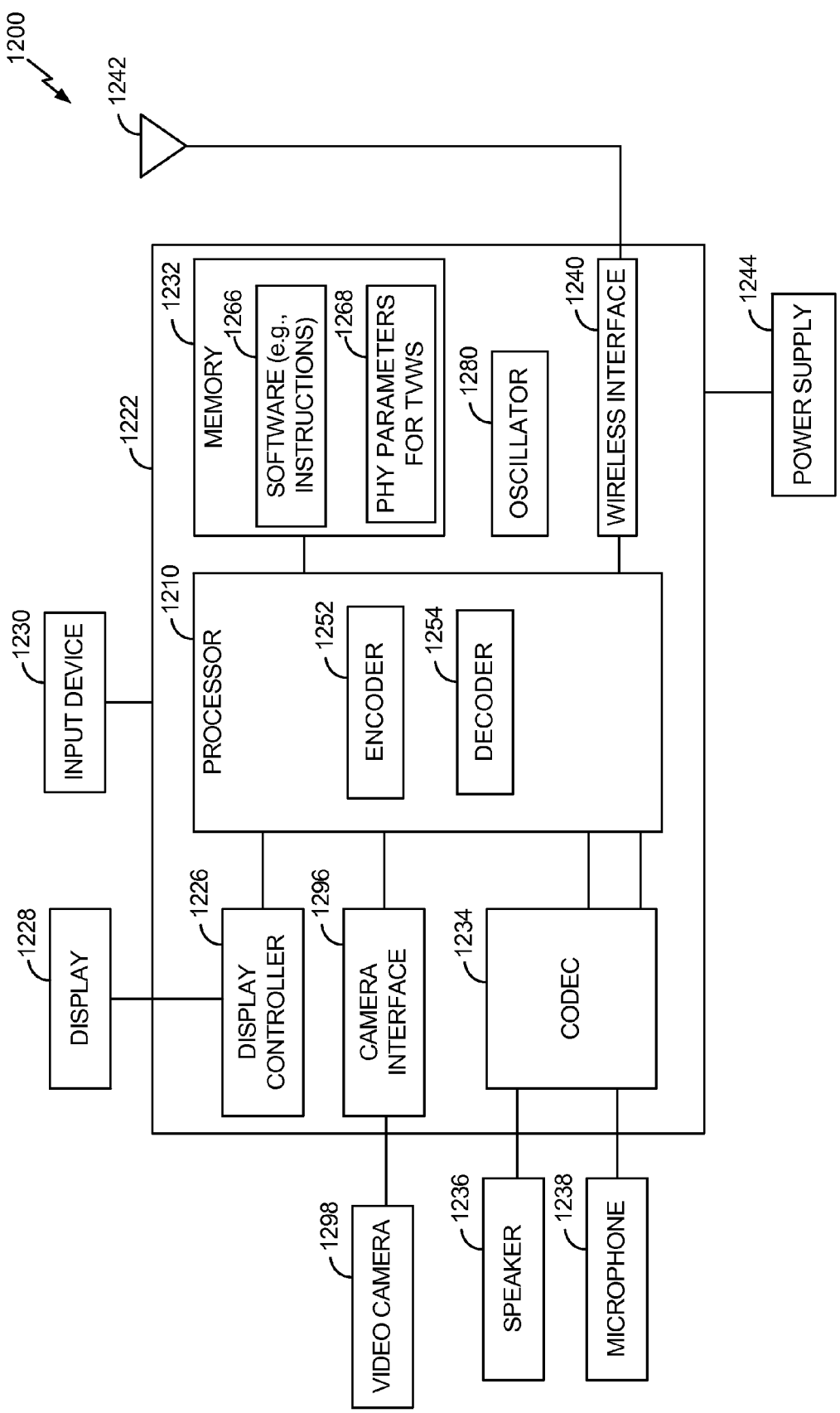
FIG. 12 is a block diagram of a particular embodiment of a device included in a wireless microphone system.

FIG. 12 is a block diagram of a particular embodiment of a device 1200 (e.g., a communication device) configured to transmit or receive data using television high throughput communication. The device 1200 may be a wireless electronic device and may include a processor 1210, such as a digital signal processor (DSP), coupled to a memory 1232. For example, the device 1200 may include the transmitter station 106 or the receiver station 160 of FIG. 1.

The processor 1210 may be configured to execute software 1266 (e.g., a program of one or more instructions) stored in the memory 1232. For example, the processor 1210 may include the processor 108 or the processor 168 of FIG. 1. In a particular embodiment, the processor 1210 may be configured to operate in accordance with at least a portion of any of the method 300 of FIG. 3, the method 400 of FIG. 4, the method 500 of FIG. 5, the method 600 of FIG. 6, the method 700 of FIG. 7, the method 800 of FIG. 8, the method 900 of FIG. 9, the method 1000 of FIG. 10, the method 1100 of FIG. 11, or any combination thereof. The memory 1232 may also include PHY parameters for TVWS 1268 (e.g., TVWS networks). For example, the PHY parameters for TVWS 1268 may include the PHY parameters 112, 172 of FIG. 1 and may include one or more parameter values illustrated in TABLES 1-4. One or more of PHY parameters for TVWS 1268 may be used by the device 1200 in conjunction with transmission or reception of one or more data packets (e.g., one or more data symbols).

In a particular embodiment, the processor 1210 may be configured to execute computer executable instructions (e.g., the software 1266) stored at a non-transitory computer-readable medium, such as the memory 1232. The instructions are executable to cause a computer, such as the processor 1210, to perform at least a portion of any of the method 300 of FIG. 3, the method 400 of FIG. 4, the method 500 of FIG. 5, the method 600 of FIG. 6, the method 700 of FIG. 7, the method 800 of FIG. 8, the method 900 of FIG. 9, the method 1000 of FIG. 10, the method 1100 of FIG. 11, or any combination thereof. For example, the computer executable instructions may be executable to cause the processor generate or process a data packet (e.g., a PPDU or a VHT data symbol). The computer executable instructions (e.g., the software 1266) are further executable to cause the processor 1210 to initiate transmission of or to receive the data packet via a TVHT bandwidth channel (e.g., a TVWS network).

The processor 1210 may include an encoder 1252 and a decoder 1254. For example, the encoder 1252 and the decoder 1254 may include the packet creation encoding module 114 and the packet decoding module 174 of FIG. 1, respectively. Although the encoder 1252 and the decoder 1254 are illustrated in FIG. 12 as being included in the processor 1210, the encoder 1252, the decoder 1254, or a combination thereof, may be included in or coupled to one or more other components, such as a wireless interface 1240, of the device 1200.

The device 1200 may also include an oscillator 1280. In a particular embodiment, the oscillator 1280 includes multiple oscillators (e.g. one or more radio frequency (RF) local oscillators (RF LOs)). In a particular embodiment, the oscillator 1280 (e.g., a reference oscillator) is used to derive one or more signals, such as a transmit center frequency, a symbol clock frequency, or a combination thereof. The oscillator 1280 may be included in or coupled to one or more components of the device 1200, such as the processor 1210, the wireless interface 1240, or a coder/decoder (CODEC) 1234. The oscillator 1280 may be configured to provide a transmit center frequency or a symbol clock frequency that is based on or complies with the PHY parameters for TVWS 1268. For example, the oscillator 1280 may produce the transmit center frequency that is within a transmit center frequency tolerance or produce the symbol clock frequency that is within a symbol clock frequency tolerance.

A camera interface 1296 may be coupled to the processor 1210 and may also be coupled to a camera, such as a video camera 1298. A display controller 1226 may be coupled to the processor 1210 and to a display device 1228. The CODEC 1234 may also be coupled to the processor 1210. A speaker 1236 and a microphone 1238 may be coupled to the CODEC 1234. The device 1200 may also include or be coupled to a power supply 1244 configured to provide power to one or more components included in or coupled to the device 1200.

The wireless interface 1240 may be coupled to the processor 1210 and to an antenna 1242 such that wireless data received via the antenna 1242 and the wireless interface 1240 may be provided to the processor 1210. For example, the wireless interface 1240 may include or correspond to the wireless controller 116, the transmitter 118, the wireless controller 176, the receiver 178 of FIG. 1, one or more transmit chains, or one or more receive chains as described with respect to FIG. 1, or a combination thereof. Although a single wireless interface 1240 and antenna 1242 or shown FIG. 12, the device 1200 may include multiple wireless interfaces, multiple antennas, or a combination thereof.

In a particular embodiment, the processor 1210, the display controller 1226, the memory 1232, the CODEC 1234, the wireless interface 1240, the camera interface 1296, the oscillator 1280, or a combination thereof are included in a system-in-package or system-on-chip device 1222. In a particular embodiment, an input device 1230 and the power supply 1244 are coupled to the system-on-chip device 1222. Moreover, in a particular embodiment, as illustrated in FIG. 12, the display device 1228, the input device 1230, the speaker 1236, the microphone 1238, the wireless antenna 1242, video camera 1298, and the power supply 1244 are external to the system-on-chip device 1222. However, each of the display device 1228, the input device 1230, the speaker 1236, the microphone 1238, the wireless antenna 1242, the video camera 1298, and the power supply 1244 can be coupled to a component of the system-on-chip device 1222, such as an interface or a controller.

In conjunction with one or more of the described embodiments, an apparatus is disclosed that includes means for generating a very high throughput (VHT) data symbol. The means for generating may include the processor 108, the packet creation encoding module 114 of FIG. 1, the processor 1210, the encoder 1252, the wireless interface 1240 of FIG. 12, one or more other devices or circuits (e.g., a transmit chain as described with reference to FIG. 1) configured to generate the VHT data symbol, or any combination thereof.

The apparatus may also include means for transmitting the VHT data symbol via a television (TV) high throughput (TVHT) bandwidth channel. The means for transmitting may include the wireless controller 116, the transmitter 118, the antenna 120 of FIG. 1, the wireless interface 1240, the antenna 1242 of FIG. 12, one or more other devices or circuits (e.g., a transmit chain as described with reference to FIG. 1) configured to transmit the VHT data symbol via the TVHT bandwidth channel, or any combination thereof.

In another embodiment, an apparatus is disclosed that includes means for generating a protocol data unit (PPDU). The means for generating may include the processor 108, the packet creation encoding module 114 of FIG. 1, the processor 1210, the encoder 1252, the wireless interface 1240 of FIG. 12, one or more other devices or circuits (e.g., a transmit chain as described with reference to FIG. 1) configured to generate the PPDU, or any combination thereof.

The apparatus may also include means for transmitting the PPDU via a television (TV) high throughput (TVHT) bandwidth channel. The means for transmitting may include the wireless controller 116, the transmitter 118, the antenna 120 of FIG. 1, the wireless interface 1240 of FIG. 12, one or more other devices or circuits (e.g., a transmit chain as described with reference to FIG. 1) configured to transmit the PPDU via the TVHT bandwidth channel, or any combination thereof.

In another embodiment, an apparatus is disclosed that includes include means for receiving a very high throughput (VHT) data symbol via a television (TV) high throughput (TVHT) bandwidth channel. The means for receiving may include the wireless controller 176, the receiver 178, the antenna 180 of FIG. 1, the wireless interface 1240 of FIG. 12, one or more other devices or circuits (e.g., a receive chain as described with reference to FIG. 1) configured to receive the VHT data symbol via the TVHT bandwidth channel, or any combination thereof.

The apparatus may also include means for processing the VHT data symbol. The means for processing may include the processor 168, the packet decoding module 174 of FIG. 1, the processor 1210, the decoder 1254, the wireless interface 1240 of FIG. 12, one or more other devices or circuits (e.g., a receive chain as described with reference to FIG. 1) configured to process the VHT data symbol, or any combination thereof.

In another embodiment, an apparatus is disclosed that includes include means for receiving a protocol data unit (PPDU) via a television (TV) high throughput (TVHT) bandwidth channel. The means for receiving may include the wireless controller 176, the receiver 178, the antenna 180 of FIG. 1, the wireless interface 1240 of FIG. 12, one or more other devices or circuits (e.g., a receive chain as described with reference to FIG. 1) configured to receive the PPDU via the TVHT bandwidth channel, or any combination thereof.

The apparatus may also include means for processing the PPDU. The means for processing may include the processor 168, the packet decoding module 174 of FIG. 1, the processor 1210, the decoder 1254, the wireless interface 1240 of FIG. 12, one or more other devices or circuits (e.g., a receive chain as described with reference to FIG. 1) configured to process the PPDU, or any combination thereof.

In a further particular embodiment, an apparatus includes means for generating a very high throughput (VHT) data symbol. The apparatus also includes means for transmitting the VHT data symbol via a television (TV) high throughput (TVHT) bandwidth channel. One or more inter-frame timing parameters are used to transmit the VHT data symbol via the TVHT bandwidth channel. The one or more inter-frame timing parameters include a clear channel assessment (CCA) time of 15 microseconds (μs) for a 6 megahertz (MHz) bandwidth channel or for a 7 MHz bandwidth channel, 11.25 μs for an 8 MHz bandwidth channel, or a combination thereof.

In another particular embodiment, a non-transitory computer readable medium includes instructions that, when executed by a processor, cause the processor to initiate transmission of a very high throughput (VHT) data symbol via a television (TV) high throughput (TVHT) bandwidth channel. One or more inter-frame timing parameters are used to transmit the VHT data symbol via the TVHT bandwidth channel. The one or more inter-frame timing parameters include a clear channel assessment (CCA) time of 15 microseconds (μs) for a 6 megahertz (MHz) bandwidth channel or for a 7 MHz bandwidth channel, 11.25 μs for an 8 MHz bandwidth channel, or a combination thereof.

In a further particular embodiment, an apparatus includes means for generating a very high throughput (VHT) data symbol. The apparatus also includes means for transmitting the VHT data symbol via a television (TV) high throughput (TVHT) bandwidth channel. One or more inter-frame timing parameters are used to transmit the VHT data symbol via the TVHT bandwidth channel. The one or more inter-frame timing parameters include a short inter-frame space (SIFS) time of 120 μs for a 6 MHz bandwidth channel or for a 7 MHz bandwidth channel, 90 μs for an 8 MHz bandwidth channel, or a combination thereof.

In another particular embodiment, a non-transitory computer readable medium includes instructions that, when executed by a processor, cause the processor to initiate transmission of a very high throughput (VHT) data symbol via a television (TV) high throughput (TVHT) bandwidth channel. One or more inter-frame timing parameters are used to transmit the VHT data symbol via the TVHT bandwidth channel. The one or more inter-frame timing parameters include a SIFS time of 120 μs for a 6 MHz bandwidth channel or for a 7 MHz bandwidth channel, 90 μs for an 8 MHz bandwidth channel, or a combination thereof.

In a particular embodiment, a method includes transmitting, from a station, a very high throughput (VHT) data symbol via a television (TV) high throughput (TVHT) bandwidth channel. A transmission of the VHT data symbol via the TVHT bandwidth channel satisfies a spectral flatness constraint associated with the VHT data symbol.

In another particular embodiment, a device includes a processor and a transmitter. The processor is configured to initiate a transmission of a very high throughput (VHT) data symbol. The transmitter is configured to transmit the VHT data symbol via a television (TV) high throughput (TVHT) bandwidth channel. The transmission of the VHT data symbol via the TVHT bandwidth channel satisfies a spectral flatness constraint associated with the VHT data symbol.

In a further particular embodiment, an apparatus includes means for generating a very high throughput (VHT) data symbol. The apparatus also includes means for transmitting the VHT data symbol via a television (TV) high throughput (TVHT) bandwidth channel. A transmission of the VHT data symbol via the TVHT bandwidth channel satisfies a spectral flatness constraint associated with the VHT data symbol.

In another particular embodiment, a non-transitory computer readable medium includes instructions that, when executed by a processor, cause the processor to initiate a transmission of a very high throughput (VHT) data symbol via a television (TV) high throughput (TVHT) bandwidth channel. The transmission of the VHT data symbol via the TVHT bandwidth channel satisfies a spectral flatness constraint associated with the VHT data symbol.

In another particular embodiment, a method includes transmitting, from a transmitter of a station, a very high throughput (VHT) data symbol via a television (TV) high throughput (TVHT) bandwidth channel. A transmit center frequency of the TVHT bandwidth channel is within a range of −25 parts per million (ppm) to +25 ppm of a target transmit center frequency. Alternatively or in addition, a symbol clock frequency used during a transmission of the VHT data symbol is within a range of −25 parts per million (ppm) to +25 ppm of a target symbol clock frequency.

In another particular embodiment, a device includes a processor and a transmitter. The processor is configured to initiate a transmission of a very high throughput (VHT) data symbol. The transmitter is configured to transmit the VHT data symbol via a television (TV) high throughput (TVHT) bandwidth channel. A transmit center frequency of the TVHT bandwidth channel is within a range of −25 parts per million (ppm) to +25 ppm of a target transmit center frequency. Alternatively or in addition, a symbol clock frequency used during the transmission of the VHT data symbol is within a second range of −25 ppm to +25 ppm of a target symbol clock frequency.

In a further particular embodiment, an apparatus includes means for generating a very high throughput (VHT) data symbol. The apparatus also includes means for transmitting the VHT data symbol via a television (TV) high throughput (TVHT) bandwidth channel. A transmit center frequency of the TVHT bandwidth channel is within a range of −25 parts per million (ppm) to +25 ppm of a target transmit center frequency. Alternatively or in addition, a symbol clock frequency used during a transmission of the VHT data symbol is within a second range of −25 ppm to +25 ppm of a target symbol clock frequency.

In another particular embodiment, a non-transitory computer readable medium includes instructions that, when executed by a processor, cause the processor to initiate a transmission of a very high throughput (VHT) data symbol via a television (TV) high throughput (TVHT) bandwidth channel. A transmit center frequency of the TVHT bandwidth channel is within a range of −25 parts per million (ppm) to +25 ppm of a target transmit center frequency. Alternatively or in addition, a symbol clock frequency used during the transmission of the VHT data symbol is within a second range of −25 ppm to +25 ppm of a target symbol clock frequency.

In another particular embodiment, a method includes transmitting, from a station, a protocol data unit (PPDU) via a television (TV) high throughput (TVHT) bandwidth channel. When a radio frequency local oscillator (RF LO) used during a transmission of the PPDU is at a center of the TVHT bandwidth channel, a power measured at the center of the TVHT bandwidth channel using a resolution bandwidth is less than an average power per-subcarrier of the transmitted PPDU or less than a value of P–10 log 10(NST). P is a total transmit power and NST is a number of subcarriers per frequency segment.

In another particular embodiment, a device includes a processor and a transmitter. The processor is configured to initiate a transmission of a protocol data unit (PPDU). The transmitter is configured to transmit the PPDU via a television (TV) high throughput (TVHT) bandwidth channel. When a radio frequency local oscillator (RF LO) used during the transmission of the PPDU is at a center of the TVHT bandwidth channel, a power measured at the center of the TVHT bandwidth channel using a resolution bandwidth is less than an average power per-subcarrier of the transmitted PPDU or less than a value of P–10 log 10(NST). P is a total transmit power and NST is a number of subcarriers per frequency segment.

In a further particular embodiment, an apparatus includes means for generating a protocol data unit (PPDU). The apparatus also includes means for transmitting the PPDU via a television (TV) high throughput (TVHT) bandwidth channel. When a radio frequency local oscillator (RF LO) used during a transmission of the PPDU is at a center of the TVHT bandwidth channel, a power measured at the center of the TVHT bandwidth channel using a resolution bandwidth is less than an average power per-subcarrier of the transmitted PPDU or less than a value of P–10 log 10(NST). P is a total transmit power and NST is a number of subcarriers per frequency segment.

In another particular embodiment, a non-transitory computer readable medium includes instructions that, when executed by a processor, cause the processor to initiate transmission of a protocol data unit (PPDU) via a television (TV) high throughput (TVHT) bandwidth channel. When a radio frequency local oscillator (RF LO) used during the transmission of the PPDU is at a center of the TVHT bandwidth channel, a power measured at the center of the TVHT bandwidth channel using a resolution bandwidth is less than an average power per-subcarrier of the transmitted PPDU or less than a value of P–10 log 10(NST). P is a total transmit power and NST is a number of subcarriers per frequency segment.

In another particular embodiment, a method includes transmitting, from a station, a protocol data unit (PPDU) via a television (TV) high throughput (TVHT) bandwidth channel. When a radio frequency local oscillator (RF LO) used during a transmission of the PPDU is not at a center of the TVHT bandwidth channel, a power measured at a location of the RF LO using a resolution bandwidth is less than a greater of a first value of –20 dBm or a second value equal to a sum of –32 decibel (dB) and a total transmit power.

In another particular embodiment, a device includes a processor and a transmitter. The processor is configured to initiate a transmission of a protocol data unit (PPDU). The transmitter is configured to transmit the PPDU via a television (TV) high throughput (TVHT) bandwidth channel When a radio frequency local oscillator (RF LO) used during the transmission of the PPDU is not at a center of the TVHT bandwidth channel, a power measured at a location of the RF LO using a resolution bandwidth is less than a greater of a first value of –20 dBm or a second value equal to a sum of –32 decibel (dB) and a total transmit power.

In a further particular embodiment, an apparatus includes means for generating a protocol data unit (PPDU). The apparatus also includes means for transmitting the PPDU via a television (TV) high throughput (TVHT) bandwidth channel. When a radio frequency local oscillator (RF LO) used during a transmission of the PPDU is not at a center of the TVHT bandwidth channel, a power measured at a location of the RF LO using a resolution bandwidth is less than a greater of a first value of –20 dBm or a second value equal to a sum of –32 decibel (dB) and a total transmit power In another particular embodiment, a non-transitory computer readable medium includes instructions that, when executed by a processor, cause the processor to initiate transmission of a protocol data unit (PPDU) via a television (TV) high throughput (TVHT) bandwidth channel. When a radio frequency local oscillator (RF LO) used during the transmission of the PPDU is not at a center of the TVHT bandwidth channel, a power measured at a location of the RF LO using a resolution bandwidth is less than a greater of a first value of –20 dBm or a second value equal to a sum of –32 decibel (dB) and a total transmit power.

In another particular embodiment, a method includes transmitting, from a station, a protocol data unit (PPDU) via a television (TV) high throughput (TVHT) bandwidth channel. When the transmitted PPDU is associated with a transmission using two non-contiguous frequency segments or two non-contiguous frequency sections and when a radio frequency local oscillator (RF LO) is outside both non-contiguous frequency segments or both non-contiguous frequency sections, the RF LO complies with one or more spectral mask constraints. Each frequency section of the two non-noncontiguous frequency sections includes two contiguous frequency segments.

In another particular embodiment, a device includes a processor and a transmitter. The processor is configured to initiate a transmission of a protocol data unit (PPDU). The transmitter is configured to transmit the PPDU via a television (TV) high throughput (TVHT) bandwidth channel. When the transmitted PPDU is associated with a transmission using two non-contiguous frequency segments or two non-contiguous frequency sections and when a radio frequency local oscillator (RF LO) is outside both non-contiguous frequency segments or both non-contiguous frequency sections, the RF LO complies with one or more spectral mask constraints. Each frequency section of the two non-noncontiguous frequency sections includes two contiguous frequency segments.

In a further particular embodiment, an apparatus includes means for generating a protocol data unit (PPDU). The apparatus also includes means for transmitting the PPDU via a television (TV) high throughput (TVHT) bandwidth channel. When the transmitted PPDU is associated with a transmission using two non-contiguous frequency segments or two non-contiguous frequency sections and when a radio frequency local oscillator (RF LO) is outside both non-contiguous frequency segments or both non-contiguous frequency sections, the RF LO complies with one or more spectral mask constraints. Each frequency section of the two non-noncontiguous frequency sections includes two contiguous frequency segments.

In another particular embodiment, a non-transitory computer readable medium includes instructions that, when executed by a processor, cause the processor initiate a transmission of a protocol data unit (PPDU) via a television (TV) high throughput (TVHT) bandwidth channel. When the transmitted PPDU is associated with a transmission using two non-contiguous frequency segments or two non-contiguous frequency sections and when a radio frequency local oscillator (RF LO) is outside both non-contiguous frequency segments or both non-contiguous frequency sections, the RF LO complies with one or more spectral mask constraints. Each frequency section of the two non-noncontiguous frequency sections includes two contiguous frequency segments.

In another particular embodiment, a method includes transmitting, from a station, a very high throughput (VHT) data symbol. A transmission of the VHT data symbol via a television (TV) high throughput (TVHT) bandwidth channel has a transmit constellation root mean square (RMS) error that complies with a transmitter constellation error constraint.

In another particular embodiment, a device includes a processor and a transmitter. The processor is configured to initiate a transmission of a very high throughput (VHT) data symbol. The transmitter is configured to transmit the VHT data symbol via a television (TV) high throughput (TVHT) bandwidth channel. The transmission of the VHT data symbol via a television (TV) high throughput (TVHT) bandwidth channel has a transmit constellation root mean square (RMS) error that complies with a transmitter constellation error constraint.

In a further particular embodiment, an apparatus includes means for generating a very high throughput (VHT) data symbol. The apparatus also includes means for transmitting the VHT data symbol via a television (TV) high throughput (TVHT) bandwidth channel. A transmission of the VHT data symbol via a television (TV) high throughput (TVHT) bandwidth channel has a transmit constellation root mean square (RMS) error that complies with a transmitter constellation error constraint.

In another particular embodiment, a non-transitory computer readable medium includes instructions that, when executed by a processor, cause the processor to initiate a transmission of a very high throughput (VHT) data symbol via a television (TV) high throughput (TVHT) bandwidth channel. The transmission of the VHT data symbol via a television (TV) high throughput (TVHT) bandwidth channel has a transmit constellation root mean square (RMS) error that complies with a transmitter constellation error constraint.

One or more of the disclosed embodiments may be implemented in a system or an apparatus, such as the device 1200, that may include a communications device, a fixed location data unit, a mobile location data unit, a mobile phone, a cellular phone, a satellite phone, a computer, a tablet, a portable computer, or a desktop computer. Additionally, the device 1200 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof.

Although one or more of FIGS. 1-12 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including a processor and a memory.

Those of skill would further appreciate that the various illustrative logical blocks, configurations, modules, circuits, and algorithm steps described in connection with the embodiments disclosed herein may be implemented as electronic hardware, computer software executed by a processor, or a combination thereof. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An illustrative storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    generating a data symbol at a station; and
    transmitting, from the station, the data symbol via a television (TV) high throughput (TVHT) bandwidth channel, wherein one or more inter-frame timing parameters are used to transmit the data symbol via the TVHT bandwidth channel, and wherein the one or more inter-frame timing parameters comprise a short inter-frame space (SIFS) time of 120 microseconds (µs) for a 6 megahertz (MHz) bandwidth channel or for a 7 MHz bandwidth channel.

2. The method of claim 1, wherein the data symbol comprises a very high throughput (VHT) data symbol.

3. The method of claim 1, wherein the one or more inter-frame timing parameters further comprise a clear channel assessment (CCA) time of 15 µs for the 6 MHz bandwidth channel or for the 7 MHz bandwidth channel.

4. The method of claim 1, wherein a transmission of the data symbol via the TVHT bandwidth channel satisfies a spectral flatness constraint associated with the data symbol.

5. The method of claim 4, wherein the spectral flatness constraint is determined to be satisfied based on spectral flatness measurements using one or more binary phase-shift keying (BPSK) modulated protocol data units (PDUs).

6. The method of claim 1, wherein a transmit center frequency of the TVHT bandwidth channel is within a range of −25 parts per million (ppm) to +25 ppm of a target transmit center frequency.

7. The method of claim 1, wherein a symbol clock frequency used during a transmission of the data symbol is within a range of −25 ppm to +25 ppm of a target symbol clock frequency.

8. The method of claim 1, wherein a transmission of the data symbol via the TVHT bandwidth channel has a transmit constellation root mean square (RMS) error that complies with a transmitter constellation error constraint.

9. The method of claim 8, wherein the TVHT bandwidth channel is a 6 MHz bandwidth channel, a 7 MHz bandwidth channel, or an 8 MHz bandwidth channel.

10. The method of claim 8, wherein, when the transmission of the data symbol is a non-high throughput (non-HT) duplicate transmission, each half of a channel bandwidth associated with the transmission of the data symbol complies with a particular transmitter constellation error constraint included in a transmitter constellation error section of an Institute of Electrical and Electronics Engineers (IEEE) 802.11b standard.

11. The method of claim 8, wherein the data symbol comprises a very high throughput (VHT) data symbol, and wherein the transmitter constellation error constraint is included in a transmitter constellation error section of an Institute of Electrical and Electronics Engineers (IEEE) 802.11ac standard.

12. The method of claim 8, wherein the transmission of the data symbol uses one frequency segment, two contiguous frequency segments, four contiguous frequency segments, two non-contiguous frequency segments, or two non-contiguous frequency sections.

13. The method of claim 12, wherein each frequency section of the two non-contiguous frequency sections comprises two contiguous frequency segments.

14. The method of claim 1, further comprising transmitting, from the station, a protocol data unit (PDU) via the TVHT bandwidth channel, wherein:
when a frequency of a radio frequency local oscillator (RF LO) used during transmitting the PDU is at a center of the TVHT bandwidth channel, a power measured at the center of the TVHT bandwidth channel is less than at least one of:
an average power per-subcarrier of the PDU, or
a value of P−10 log$_{10}$(N$_{ST}$), wherein P is a total transmit power and N$_{ST}$ is a number of subcarriers per frequency segment;
when the frequency of the RF LO used during transmitting the PDU is not at the center of the TVHT bandwidth channel, a power measured at a location of the RF LO is less than a greater of a first value of −20 decibel-milliwatts (dBm) or a second value equal to a sum of −32 decibel (dB) and a total transmit power; or
when the PDU is associated with two non-contiguous frequency segments or two non-contiguous frequency sections and when the frequency of the RF LO is outside both of the two non-contiguous frequency segments or both of the two non-contiguous frequency sections, the RF LO complies with one or more spectral mask constraints.

15. The method of claim 14, wherein each frequency section of the two non-contiguous frequency sections comprises two contiguous frequency segments.

16. A device comprising:
a processor configured to initiate a transmission of a data symbol; and
a transmitter configured to transmit the data symbol via a television (TV) high throughput (TVHT) bandwidth channel, wherein one or more inter-frame timing parameters are used to transmit the data symbol via the TVHT bandwidth channel, and wherein the one or more inter-frame timing parameters comprise a short inter-frame space (SIFS) time of 120 microseconds (μs) for a 6 MHz bandwidth channel or for a 7 MHz bandwidth channel.

17. The device of claim 16, wherein the data symbol comprises a very high throughput (VHT) data symbol.

18. The device of claim 16, wherein the one or more inter-frame timing parameters further comprise a clear channel assessment (CCA) time of 15 μs for the 6 MHz bandwidth channel or for the 7 MHz bandwidth channel.

19. The device of claim 16, wherein the transmission of the data symbol via the TVHT bandwidth channel satisfies a spectral flatness constraint associated with the data symbol.

20. The device of claim 19, wherein the spectral flatness constraint is determined to be satisfied based on spectral flatness measurements using one or more binary phase-shift keying (BPSK) modulated protocol data units (PDUs).

21. The device of claim 16, wherein a transmit center frequency of the TVHT bandwidth channel is within a range of −25 parts per million (ppm) to +25 ppm of a target transmit center frequency.

22. The device of claim 16, wherein a symbol clock frequency used during a transmission of the data symbol is within a range of −25 ppm to +25 ppm of a target symbol clock frequency.

23. The device of claim 16, wherein the transmission of the data symbol via the TVHT bandwidth channel has a transmit constellation root mean square (RMS) error that complies with a transmitter constellation error constraint.

24. The device of claim 23, wherein the TVHT bandwidth channel is a 6 MHz bandwidth channel, a 7 MHz bandwidth channel, or an 8 MHz bandwidth channel.

25. The device of claim 23, wherein, when the transmission of the data symbol is a non-high throughput (non-HT) duplicate transmission, each half of a channel bandwidth associated with the transmission of the data symbol complies with a particular transmitter constellation error constraint included in a transmitter constellation error section of an Institute of Electrical and Electronics Engineers (IEEE) 802.11b standard.

26. The device of claim 23, wherein the data symbol comprises a very high throughput (VHT) data symbol, and wherein the transmitter constellation error constraint is included in a transmitter constellation error section of an Institute of Electrical and Electronics Engineers (IEEE) 802.11ac standard.

27. The device of claim 23, wherein the transmission of the data symbol uses one frequency segment, two contiguous frequency segments, four contiguous frequency segments, two non-contiguous frequency segments, or two non-contiguous frequency sections.

28. The device of claim 27, wherein each frequency section of the two non-contiguous frequency sections comprises two contiguous frequency segments.

29. The device of claim 16, wherein:
the processor is further configured to initiate transmission of a protocol data unit (PDU); and the transmitter is further configured to transmit the PDU via the TVHT bandwidth channel, wherein:
when a frequency of a radio frequency local oscillator (RF LO) used during a transmission of the PDU is at a center of the TVHT bandwidth channel, a power measured at the center of the TVHT bandwidth channel is less than at least one of:
an average power per-subcarrier of the PDU, or
a value of $P-10 \log_{10}(N_{ST})$, and wherein P is a total transmit power and $N_{ST}$ is a number of subcarriers per frequency segment;
when a frequency of the RF LO used during the transmission of the PDU is not at the center of the TVHT bandwidth channel, a power measured at a location of the RF LO is less than a greater of a first value of −20 decibel-milliwatts (dBm) or a second value equal to a sum of −32 decibel (dB) and a total transmit power; and
when the PDU is associated with two non-contiguous frequency segments or two non-contiguous frequency sections and when the frequency of the RF LO is outside both of the two non-contiguous frequency segments or both of the two non-contiguous frequency sections, the RF LO complies with one or more spectral mask constraints.

30. The device of claim 29, wherein each frequency section of the two non-contiguous frequency sections comprises two contiguous frequency segments.

31. A method comprising:
generating a data symbol at a station; and
transmitting, from the station, the data symbol via a television (TV) high throughput (TVHT) bandwidth channel, wherein one or more inter-frame timing parameters are used to transmit the data symbol via the TVHT bandwidth channel, and wherein the one or more inter-frame timing parameters comprise a clear channel assessment (CCA) time of 15 microseconds (μs) for a 6 megahertz (MHz) bandwidth channel or for a 7 MHz bandwidth channel.

32. The method of claim 31, wherein the data symbol comprises a very high throughput (VHT) symbol.

33. The method of claim 31, wherein the one or more inter-frame timing parameters further comprise a short inter-frame space (SIFS) of 115 μs or 121 μs.

34. A device comprising:
a processor configured to initiate a transmission of a data symbol; and
a transmitter configured to transmit the data symbol via a television (TV) high throughput (TVHT) bandwidth channel, wherein one or more inter-frame timing parameters are used to transmit the data symbol via the TVHT bandwidth channel, and wherein the one or more inter-frame timing parameters include a clear channel assessment (CCA) time of 15 microseconds (μs) for a 6 megahertz (MHz) bandwidth channel or for a 7 MHz bandwidth channel.

35. The device of claim 34, wherein the data symbol comprises a very high throughput (VHT) data symbol.

36. The device of claim 34, wherein the one or more inter-frame timing parameters further comprise a second CCA time of 11.25 μs for an 8 MHz bandwidth channel.

37. A device comprising:
a receiver configured to receive a transmission of a data symbol via a television (TV) high throughput (TVHT) bandwidth channel, wherein one or more inter-frame timing parameters are used to receive the data symbol via the TVHT bandwidth channel, and wherein the one or more inter-frame timing parameters comprise a short inter-frame space (SIFS) time of 120 microseconds (μs) for a 6 megahertz (MHz) bandwidth channel or for a 7 MHz bandwidth channel; and
a processor coupled to the receiver, wherein the processor receives the data symbol via the receiver.

38. The device of claim 37, wherein the data symbol comprises a very high throughput (VHT) data symbol.

39. The device of claim 37, wherein the one or more inter-frame timing parameters further comprise a clear channel assessment (CCA) time of 15 μs for the 6 MHz bandwidth channel or for the 7 MHz bandwidth channel.

40. The device of claim 37, wherein the transmission of the data symbol via the TVHT bandwidth channel satisfies a spectral flatness constraint associated with the data symbol.

41. The device of claim 40, wherein the spectral flatness constraint is determined to be satisfied based on spectral flatness measurements using one or more binary phase-shift keying (BPSK) modulated protocol data units (PDUs).

42. The device of claim 37, wherein the transmission of the data symbol via the TVHT bandwidth channel has a transmit constellation root mean square (RMS) error that complies with a transmitter constellation error constraint, wherein a transmit center frequency of the TVHT bandwidth channel is within a first range of −25 parts per million (ppm) to +25 ppm of a target transmit center frequency, and wherein a symbol clock frequency used during the transmission of the data symbol is within a second range of −25 ppm to +25 ppm of a target symbol clock frequency.

43. The device of claim 37, wherein the receiver is further configured to receive a second transmission of a protocol data unit (PDU) via the TVHT bandwidth channel, wherein:
when a frequency of a radio frequency local oscillator (RF LO) of a transmitting device used in association with the second transmission of the PDU is at a center of the TVHT bandwidth channel, a power measured at the center of the TVHT bandwidth channel is less than at least one of:
an average power per-subcarrier of the PDU, or a value of $P-10 \log_{10}(N_{ST})$, and wherein P is a total transmit power and $N_{ST}$ is a number of subcarriers per frequency segment;
when a frequency of a RF LO of a transmitting device used in association with the second transmission of the PDU is not at a center of the TVHT bandwidth channel, a power measured at a location of the RF LO is less than a greater of a first value of −20 decibel-milliwatts (dBm) or a second value equal to a sum of −32 decibel (dB) and a total transmit power; and
when the PDU is associated with two non-contiguous frequency segments or two non-contiguous frequency sections and when the frequency of the RF LO is outside both of the two non-contiguous frequency segments or both of the two non-contiguous frequency sections, the RF LO complies with one or more spectral mask constraints.

44. The device of claim 43, wherein each frequency section of the two non-contiguous frequency sections comprises two contiguous frequency segments.

* * * * *